United States Patent
Sasaki et al.

(10) Patent No.: US 9,126,634 B2
(45) Date of Patent: Sep. 8, 2015

(54) STRUCTURE FOR FRONT PORTION OF VEHICLE

(71) Applicant: HONDA MOTOR CO., LTD., Minato-Ku, Tokyo (JP)

(72) Inventors: Kazutada Sasaki, Wako (JP); Hidefumi Nihei, Wako (JP); Daisuke Naoi, Wako (JP); Masanobu Eguchi, Wako (JP); Minoru Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/371,501

(22) PCT Filed: Oct. 12, 2012

(86) PCT No.: PCT/JP2012/076534
§ 371 (c)(1),
(2) Date: Jul. 10, 2014

(87) PCT Pub. No.: WO2013/105322
PCT Pub. Date: Jul. 18, 2013

(65) Prior Publication Data
US 2015/0015030 A1 Jan. 15, 2015

(30) Foreign Application Priority Data
Jan. 11, 2012 (JP) ................................. 2012-003110

(51) Int. Cl.
*B62D 25/08* (2006.01)

(52) U.S. Cl.
CPC ............ *B62D 25/081* (2013.01); *B62D 25/088* (2013.01)

(58) Field of Classification Search
CPC ............................ B62D 25/088; B62D 25/081

USPC .................. 296/192, 187.09, 208, 193.09
See application file for complete search history.

(56) References Cited

U.S. PATENT DOCUMENTS

| 4,721,032 A | 1/1988 | Sakamoto |
| 6,322,440 B1 | 11/2001 | Nakatani |

(Continued)

FOREIGN PATENT DOCUMENTS

| EP | 0 301 494 A2 | 2/1989 |
| EP | 1 955 931 A2 | 8/2008 |
| GB | 2467230 A | 7/2010 |
| JP | S64-030888 A | 2/1989 |
| JP | H03-208781 A | 9/1991 |

(Continued)

OTHER PUBLICATIONS extended European search report dated Jul. 8, 2015 issued in the corresponding EP Patent Application No. 12864768.2.

*Primary Examiner* — Joseph D Pape
(74) *Attorney, Agent, or Firm* — Carrier Blackman & Associates, P.C.; William D. Blackman; Anne G. Sabourin

(57) ABSTRACT

A structure (100) for a front portion of a vehicle includes: a windshield lower member (6); a cross member (7) fixed to the windshield lower member (6); paired damper housings (4) disposed in front of both ends of the cross member (7); and paired damper housing supports (5) arranged between the cross member (7) and the damper housing (4) to drain water. The windshield lower member (6) and the cross member (7) define a closed cross section K which extends in the vehicle width direction and serves as a second intake path (R2). The cross member (7) has, in rear of the damper housing supports (5), paired left and right outside air intake openings (72a, 72b) for outside air to pass therethrough. The windshield base member (6) has a blower air intake opening (62a) opened to face one of the pair of outside air intake openings (72a, 72b).

18 Claims, 22 Drawing Sheets

(56) References Cited

U.S. PATENT DOCUMENTS

| | | | |
|---|---|---|---|
| 7,976,097 B2 * | 7/2011 | Watanabe et al. | 296/192 |
| 9,033,400 B2 * | 5/2015 | Sasaki et al. | 296/187.09 |
| 2008/0185875 A1 | 8/2008 | Joest et al. | |

FOREIGN PATENT DOCUMENTS

| | | |
|---|---|---|
| JP | H09-095261 A | 4/1997 |
| JP | 2006-007982 A | 1/2006 |
| JP | 2011-084093 A | 4/2011 |

* cited by examiner

FIG. 21
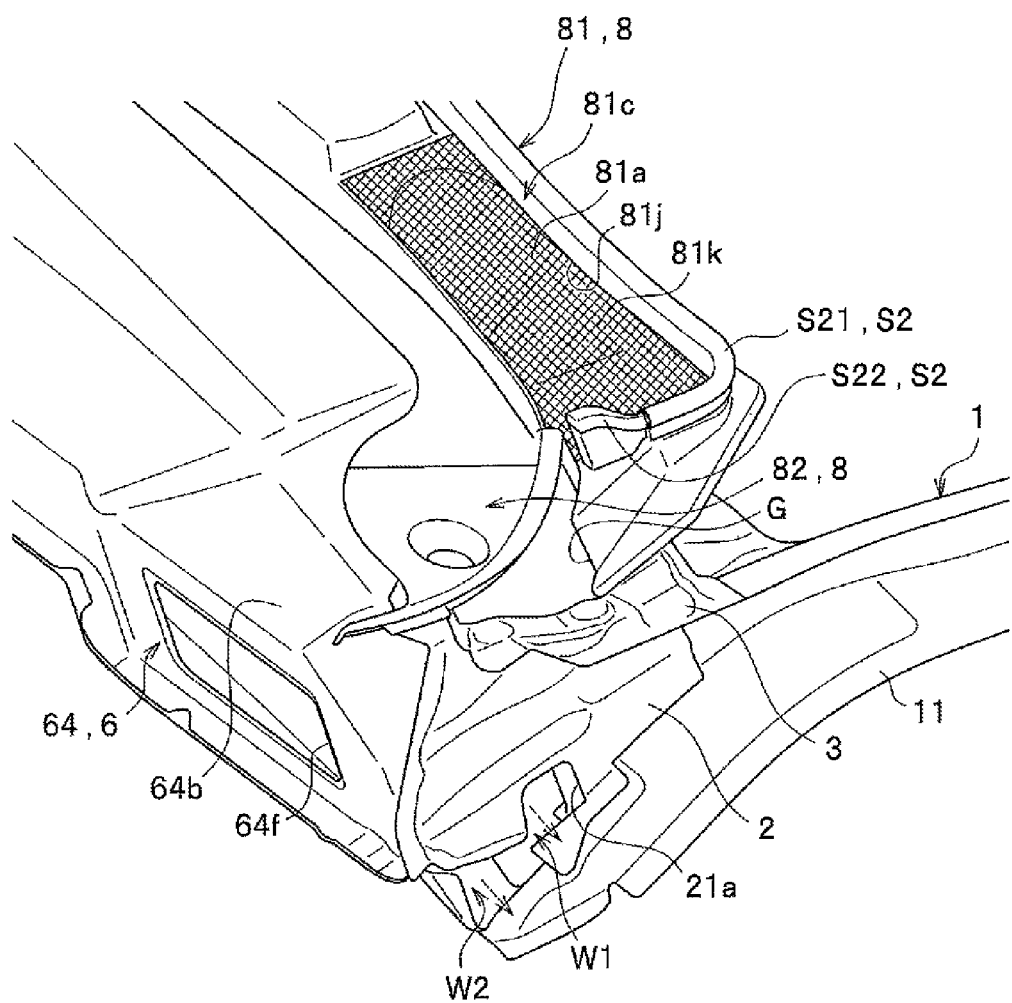
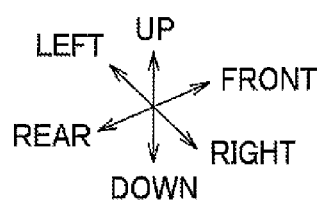

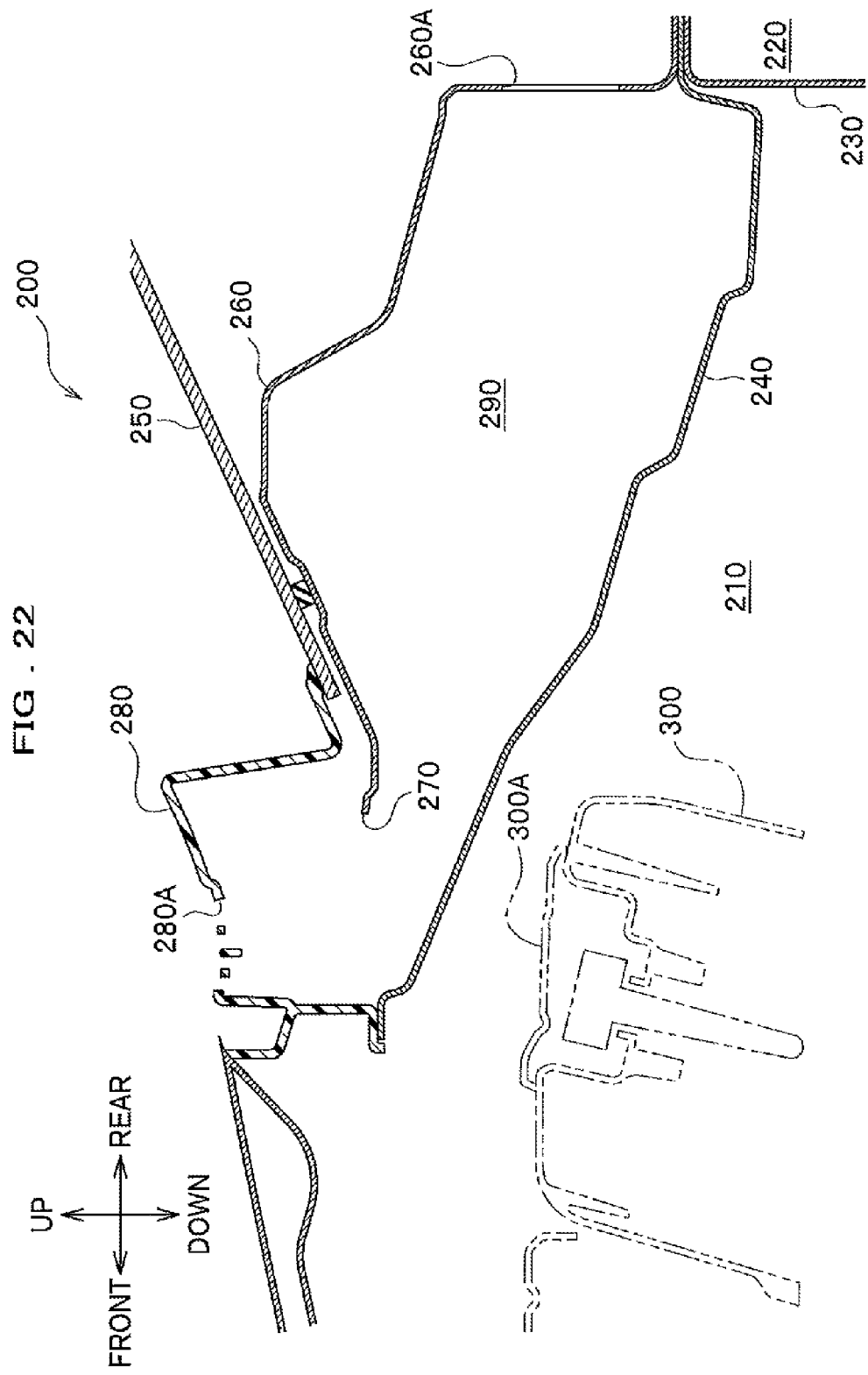

STRUCTURE FOR FRONT PORTION OF VEHICLE

TECHNICAL FIELD

The present invention relates to a structure for a front portion of a vehicle.

BACKGROUND ART

Conventionally, a structure for a front portion of a vehicle is known which has an outside air introducing function for introducing an outside air, as well as a gas-liquid separation function for separating the outside air and the water from each other.

For example, Patent Document 1 discloses a structure in which an air intake box having both an outside air introduction opening and a water drainage groove is provided on a damper housing, and an empty space is delimited by a plurality of panels combined together at a right end of a cowl panel, so that the outside air is guided from the air intake box via the empty space of the cowl panel to the blower. Further, Patent Document 1 discloses a structure in which an outside air introduction opening is also provided on an upper surface close to the center of the cowl panel, and a duct is provided which communicates between the outside air introduction opening and the empty space, so that the outside air is introduced from the outside air introduction opening via the empty space of the cowl panel to the blower.

FIG. 22 shows a conventional structure for a front portion of a vehicle which has a room space expanded by shifting the position of a front glass frontward up to the above of the damper housing. It is noted that FIG. 22 is a sectional side end view of the conventional structure for the front portion of the vehicle 200.

As shown in FIG. 22, the conventional structure for the front portion of the vehicle 200 includes: a dashboard upper member 240 extending and protruding from the upper end of a dashboard lower member 230 separating an engine room 210 from a passenger room 220; a windshield lower member 260 supporting the lower end of a front glass 250; and a cowl top 280 covering an outside air intake opening 270 formed between the dashboard upper member 240 and the windshield lower member 260. The cowl top 280 is formed with an outside air intake hole 280A, and the windshield lower member 260 is formed with a blower air intake opening 260A connected to a blower which is not shown in the figure.

The outside air is introduced from the outside air intake hole 280A into the cowl top 280, and flows through the outside air intake opening 270 and the blower air intake opening 260A to the blower. On the other hand, water flows from the outside air intake hole 280A to the cowl top 280, and then is separated from the outside air at a space 290 defined by the dashboard upper member 240 and the windshield lower member 260, and is drained to the vehicle outside from a drainage section which is not shown in the figure.

PRIOR TECHNICAL DOCUMENT

Patent Document

Patent Document 1: Japanese Patent Application Laid-Open Publication No. S64-30888

SUMMARY OF THE INVENTION

Technical Problem

Meanwhile, it is preferred to arrange the top point (cowl point) of the cowl top and the engine hood as low as possible in order to improve the vehicle frontward visibility. The structure described in Patent Document 1, however, is provided with a water drainage groove on the damper housing, and needs to ensure a sufficient height (depth) of the water drainage groove. Thus, this structure fails to lower the engine hood disposed above the damper housing. Moreover, if the cowl panel is also provided with the outside air introduction opening on the upper surface thereof close to the center thereof, it is necessary to provide a duct, as another component, communicating between the outside air introduction opening and the empty space. This requires the duct arranged at a higher position in order to prevent interference between the duct and the engine. Thus, the engine hood fails to be lowered.

On the other hand, in the conventional structure for the front portion of the vehicle 200 as shown in FIG. 22, the gas-liquid separation is performed in the space 290, and the dashboard upper member 240 of a large sectional dimension needs to be used to enlarge the sectional area of the space 290 in order to decrease the flow speed of the water. This reduces, by that amount, the clearance between the dashboard upper member 240 and the engine head 300A, which makes it impossible for the cowl top 280 to be lowered significantly.

Also, in the conventional structure for the front portion of the vehicle 200, a larger cross-sectional dimension of the dashboard upper member 240 causes a smaller clearance between the dashboard upper member 240 and the engine 300 in the vehicle front-rear direction. By that amount, the dashboard upper member 240 and the windshield lower member 260 fails to be arranged in a more front position. This prevents the front glass 250 from being arranged at a more front position, which accordingly prevents an expansion of the room space, thus causing a problem.

The present invention is created in view of the above, and is directed to providing a structure for a front portion of a vehicle which is capable of achieving a satisfactory gas-liquid separation, improving the visibility, and expanding the room space.

Solution to Problem

To solve the problem, the present invention is a structure for a front portion of a vehicle, including: a windshield lower member supporting a front glass from below; a cross member fixed on the windshield lower member and disposed between paired left and right front pillars; paired left and right damper housings disposed in front of left and right ends of the cross member and supporting a damper, respectively; and paired left and right damper housing supports, disposed between the cross member and the damper housings for draining, toward vehicle side areas, water after having flowed in from the vehicle outside; wherein the windshield lower member and the cross member define a closed cross section extending in a vehicle width direction and serving as an air intake path; wherein the cross member has, in rear of the damper housing supports, paired left and right outside air intake openings for outside air to pass therethrough; wherein the windshield lower member includes a blower air intake opening opened to face either one of the outside air intake openings and connecting with a blower.

According to the present invention, the cross member has the paired left and right outside air intake openings for the outside air to pass therethrough. Additionally, the windshield lower member includes the blower air intake opening connecting with the blower. Additionally, the closed cross section formed by the windshield lower member and the cross member serves as an air intake path for the paired left and right outside air intake openings to communicate with the blower air intake opening. Thereby, the outside air is taken into the blower, through the pair of left and right outside air intake openings, the closed cross section and the blower air intake opening. Accordingly, a sufficient amount of the outside air is supplied into the room, while the flow speed of the outside air from the outside air intake opening is decreased, thereby reducing power consumption of the blower.

According to the present invention, the structure comprises the paired left and right damper housing supports for draining the water having flowed from the vehicle outside to the side area of the vehicle. Additionally, the cross member is disposed at the rear of the damper housing supports. Thereby, the water after having flowed from the vehicle outside is either guided directly to the damper housing, or guided to the damper housing after hitting the cross member, and thereafter the water is drained to the side area of the vehicle.

Also, according to the present invention, a satisfactory gas-liquid separation is performed by the paired left and right damper housing supports, the cross member and the windshield lower member. Thereby, the dashboard upper member of a large cross-sectional dimension is made unnecessary, which, by that amount, lowers the windshield lower member, the cowl top and other members. Thereby, the frontward visibility from the vehicle is improved.

According to the present invention, the dashboard upper member of a large cross-sectional dimension is made unnecessary, and, by that amount, the windshield lower member, the cowl top and other members are arranged at more front positions. Thereby, the front glass is arranged at a more front position, which has the room space expanded.

Also, according to the present invention, the damper housing support for draining to the side area of the vehicle the water after having flowed in from the vehicle outside is disposed between the cross member and the damper housing, which lowers the engine hood disposed above the damper housings as compared to a case where the water drainage groove is arranged on the damper housing. Also, the outside air intake openings for allowing the passage of the outside air are disposed at both left and right ends of the cross member, which makes the duct unnecessary and, by that amount, the engine hood lowered.

Preferably, the damper housing has an upper surface defining a flow regulating surface for outside air to flow thereon, and the outside air intake opening has a lower edge positioned above the flow regulating surface.

According to this structure, the lower end of the lower edge of the outside air intake opening of the cross member is positioned above the flow regulating surface defined by the upper surface of the damper housing. Thereby, the water, the mass of which is greater than the mass of outside air, and further tends to hit the cross member, which achieves efficient gas-liquid separation.

Preferably, the blower air intake opening is positioned below one of the outside air intake openings.

According to this structure, the blower air intake opening is positioned below one of the outside air intake openings. Thereby, even when the water passes through the outside air intake opening, the water hits the upper portion from the blower air intake opening of the windshield lower member, which further prevents the water from entering into the blower air intake opening.

Preferably, the damper housing support includes: a damper housing fixation portion fixed on an upper surface of the damper housing; a lateral wall portion protruding downward and rearward from a rear end of the damper housing fixation portion and extending along a rear end of the damper housing, the lateral wall portion being fixed on the cross member; and a vertical wall portion protruding rearward from a vehicle width directional inside of the damper housing fixation portion and fixed on the cross member.

According to this structure, the lateral wall portion of the damper housing support protrudes downward and rearward from the rear end of the damper housing fixation portion fixed on the upper surface of the damper housing. Thereby, the lateral wall portion and the cross member form a drainage groove extending in the left-right direction, to satisfactorily drain the water to the side area of the vehicle.

Also, the vertical wall portion of the damper housing support protrudes rearward from the vehicle width directional inside of the damper housing fixation portion so as to be fixed on the cross member. Thereby, the drainage groove is blocked at the inside in the vehicle width direction thereof, which prevents the water, after having flowed into the drainage groove, from further flowing to the inside in the vehicle width direction.

Further, the damper housing support connects the damper housing and the cross member, thereby improving the support stiffness of the damper housing.

Preferably, the lateral wall portion is inclined downwardly in such a manner that the lateral wall portion is positioned to be lower as extending toward outside in the vehicle width direction.

According to this structure, the lateral wall portion of the damper housing support is inclined downwardly in such a manner that the lateral wall portion is positioned to be lower as extending toward outside in the vehicle width direction. Thereby, the water after having been guided to the damper housing support flows down on the lateral wall portion to be satisfactorily drained to the side area of the vehicle by its own weight.

Preferably, the structure further includes a cowl top covering an opening formed between the windshield lower member and an engine hood, and the cowl top has paired left and right outside air introduction openings, disposed below the engine hood and at a predetermined distance apart from the engine hood for introducing outside air, and the damper housing support extends frontward and inward in the vehicle width direction from the upper surface of the damper housing, and the cowl top and the damper housing support define a first air intake path extending in a front-rear direction.

According to this structure, the outside air introduction opening for introducing the outside air is disposed below the engine hood and at a predetermined distance apart from the engine hood, which prevents water from entering from vehicle outside. Also, the damper housing support extends inward in the vehicle width direction from the upper surface of the damper housing, which increases the width dimension of the outside air introduction opening. Thereby, even when the height dimension below the outside air introduction opening is set to be small, a sufficient amount of outside air to be introduced is ensured, and the position of the engine hood is lowered by reducing the height dimension below the outside air introduction opening. Further, the outside air introduction opening is disposed below the engine hood and at a predetermined distance apart from the engine hood and the damper housing support extends frontward from the upper surface of the damper housing. Thereby, the front-rear directional distance from the outside air introduction opening to the blower air intake opening increases, which prevents the water from entering into the blower air intake opening.

Preferably, the damper housing support connects the cross member and the damper housing and is formed in a substantially rectangle or substantially trapezoid in a plan view, and the damper housing support has a front end formed to be wider than the upper surface of the damper housing, and the damper housing support includes a flange portion formed around an outer periphery of the damper housing support, and the flange portion and the cowl top have a first seal provided therebetween.

According to this structure, the damper housing support connects the cross member and the damper housing and is formed in a substantially rectangle or substantially trapezoid in a plan view. Additionally, a front end of the damper housing support is formed to be wider than the upper surface of the damper housing. Thereby, the width dimension of the outside air introduction opening increases, which introduces a sufficient amount of the outside air from the outside air introduction opening. The damper housing support includes the flange portion formed around the outer periphery of the damper housing support, and has the first seal provided between the flange portion and the cowl top, which prevents the heated air coming from the engine room from flowing into the first air intake path.

Preferably, the windshield lower member includes bulge portions formed at both vehicle width directional ends of the windshield lower member, the bulge portions bulging above the vehicle width directional center of the windshield lower member, and the first air intake path is defined by the cowl top, the damper housing support and the bulge portion.

According to this structure, the windshield lower member includes bulge portions which are formed at both vehicle width directional ends of the windshield lower member and bulge above the vehicle width directional center, of the windshield lower member, and the first air intake path is defined by the cowl top, the damper housing support and the bulge portion. Thereby, the height dimension of the first air intake opening is increased to introduce a sufficient amount of the outside air, and the vehicle width directional center of the wind shield lower member is lowered, which lowers the position of the engine hood.

Preferably, at least one of the damper housing support and the cowl top includes a wall portion extending toward the other one of the damper housing support and the cowl top to form a side wall of the first air intake path.

According to this structure, at least one of the damper housing support and the cowl top includes a wall portion extending toward the other one of the damper housing support and the cowl top to form a side wall of the first air intake path. Thereby, the outside air is prevented from leaking out of the first air intake path so that the capacity of the first air intake path is increased.

Preferably, the outside air introduction opening is disposed below a rear end of the engine hood.

According to this structure, the outside air introduction opening is disposed below a rear end of the engine hood, which prevents the water from entering from vehicle outside.

Preferably, the outside air introduction opening is constructed with a wire net-like component.

According to this structure, the outside air introduction opening is constructed with a wire net-like component. Thereby, the outside air is introduced efficiently through the wire net-like component of a high open percentage, while water, dust and the like being adsorbed (collected).

Preferably, the cross member includes: a cross member main body disposed between the paired left and right front pillars; paired left and right reinforcement members disposed at both vehicle width directional ends of the cross member main body and arranged between the windshield lower member and the cross member main body, and the reinforcement members are inclined in such a manner that the reinforcement members are positioned to be higher as extending from front to rear, and the reinforcement members have the outside air intake openings, respectively.

According to this structure, the reinforcement members disposed at both vehicle width directional ends of the cross member main body are inclined in such a manner that the reinforcement members are positioned to be higher as extending from front to rear, and the reinforcement members have the outside air intake openings. This structure reduces the flow-in resistance against the outside air flowing through the outside air intake opening of the reinforcement member, thereby reducing the power consumption of the blower.

Preferably, the damper housing support has a recessed portion formed with paired left and right first inclined surfaces which are inclined in such a manner that the first inclined surfaces are positioned to be lower as extending from each end toward the center in the vehicle width direction, and the recessed portion is inclined in such a manner that the recessed portion is positioned to be lower as extending from front to rear.

According to this structure, the damper housing support has a recessed portion formed with paired left and right first inclined surfaces which are inclined in such a manner that the left and right first inclined surfaces are positioned to be lower as extending from each end toward the center in the vehicle width direction, and the recessed portion is inclined in such a manner that the recessed portion is positioned to be lower as extending from front to rear. Thereby, the water on the damper housing support readily flows down on the paired left and right first inclined surfaces and the recessed portion to the water drainage groove between the lateral wall portion and the cross member by its own weight.

Preferably, the cross member has a lower wall portion defining a bottom surface of the closed cross section, and both end sides of the lower wall portion in the vehicle width directional are inclined downwardly in such a manner that the end sides of the lower wall portion are positioned to be lower as extending outward in the vehicle width direction.

According to this structure, the cross member has a lower wall portion defining a bottom surface of the closed cross section, and both end side portions of the lower wall portion in the vehicle width direction are inclined downwardly in such a manner that the end side portions are positioned to be lower as extending outward in the vehicle width direction. Thereby, the water on the lower wall portion of the cross member readily flows down on the lower wall portion by its own weight to be drained to the vehicle outside.

Preferably, the cowl top and the engine hood have a second seal provided therebetween.

According to this structure, a second seal is provided between the cowl top and the engine hood, the heated air from the engine room is prevented from flowing into the outside air introduction opening.

Preferably, the engine hood includes: a lower surface facing an engine room; and the second inclined surface continuously extending from a rear end of the lower surface and inclined in such a manner that the second inclined surface is positioned to be higher as extending from front to rear, and the second seal includes: a lower surface seal pressingly contacting the lower surface; and an inclined surface seal formed separately from the lower surface seal and pressingly contacting the second inclined surface.

If a single seal pressingly contacts both the lower surface and the inclined surface, the seal would be bent at the boundary between the two surfaces and therefore causes a concavity on the surface of the seal, thereby producing a gap between the seal and the engine hood. In the present invention, the second seal includes: a lower surface seal pressingly contacting the lower surface of the engine hood; and an inclined surface seal formed separately from the lower surface seal and pressingly contacting the second inclined surface of the engine hood. This structure prevents the second seal from bending, and a gap between the second seal and the engine hood from occurring.

Preferably, either one of the paired outside air introduction openings is arranged to face the blower air intake opening and is formed to be wider than the other one of the paired outside air introduction openings.

According to this structure, either one of the pair of the outside air introduction openings is arranged to face the blower air intake opening and is formed to be wider than the other. Thereby, a greater amount of outside air is introduced from one of the outside air introduction openings through which the outside air flows substantially linearly (smoothly) toward the blower air intake opening, so that more outside air is taken into the blower.

Preferably, the cowl top includes a rear end including: both vehicle width directional sides disposed at both vehicle width directional end sides of the windshield lower member; and a vehicle width directional center side disposed at a vehicle width directional center side of the windshield lower member, and the vehicle width directional center side of the cowl top is disposed in front of the closed cross section.

According to this structure, the cowl top is structured such that both sides of a rear end thereof in the vehicle width direction are disposed at both vehicle width directional end sides of the windshield lower member, and the center side of the rear end thereof in the vehicle width direction is disposed at the vehicle width directional center side of the windshield lower member, and the center side of the cowl top in the vehicle width direction is disposed in front of the closed cross section. Thereby, the position of the engine hood is lowered even when the engine is disposed below the cowl top.

Preferably, the windshield lower member includes a groove-like extending portion extending frontward beyond the front glass, and the cowl top includes: a rear wall portion disposed above the extending portion and fixed on the front glass; and a rib disposed at a front end of the extending portion in front of the rear wall portion and extending in an up-down direction.

According to this structure, the windshield lower member includes a groove-like extending portion extending frontward beyond the front glass, and the extending portion defines a water drainage path for the water after having flowed from the front glass to be drained therethrough. The cowl top includes: a rear wall portion disposed above the extending portion; and a rib disposed at a front end of the extending portion in front of the rear wall portion and extending in an up-down direction, which prevents the water flowing on the extending portion from leaking outside. Further, the cowl top is disposed on the extending portion with the intervening rib, which improves the support stiffness of the cowl top.

Advantageous Effects of Invention

The present invention provides a structure of a front portion of a vehicle which is capable of achieving a satisfactory gas-liquid separation, improving the visibility and expanding the room space.

BRIEF DESCRIPTION OF THE DRAWINGS

FIG. 21 is a partially enlarged perspective view schematically illustrating a side area of the vehicle front structure from which water drains.

FIG. 22 is a sectional side end view of a conventional vehicle front structure.

DETAILED DESCRIPTION OF THE INVENTION

Figure 1:
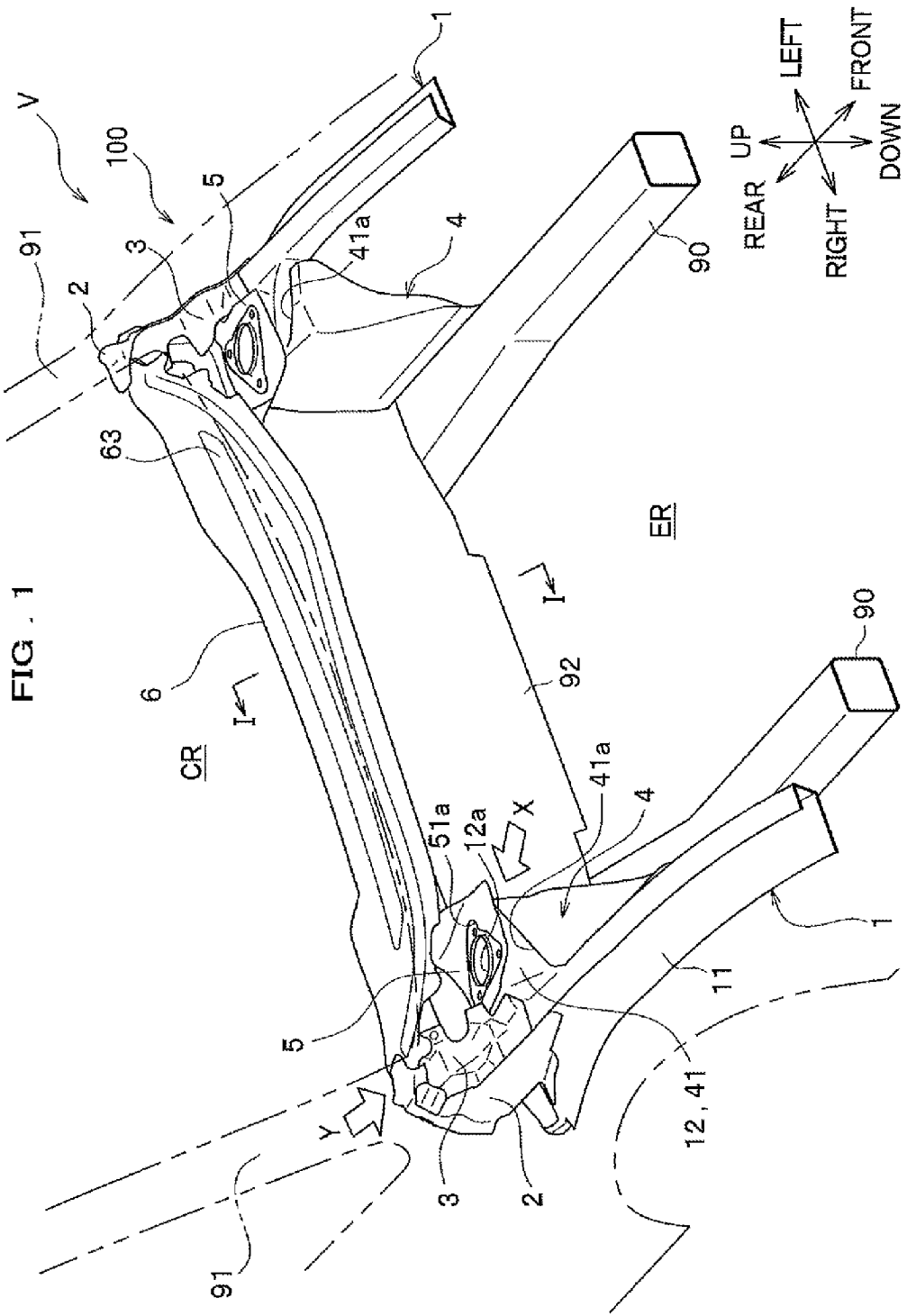
FIG. 1 is a schematic overall perspective view illustrating a structure for a front portion of a vehicle (a vehicle front structure) according to a first embodiment of the present invention.

The first embodiment of the present invention will be described in detail with reference to FIG. 1 to FIG. 10. In the description, the same reference numerals are given to the same elements, and redundant description is omitted.

Moreover, when directions are referred, the description is made with reference to "front", "rear", "left", "right", "up" and "down", of a vehicle V. It is noted that a vehicle width direction is synonymous with a left-right direction.

Figure 2:
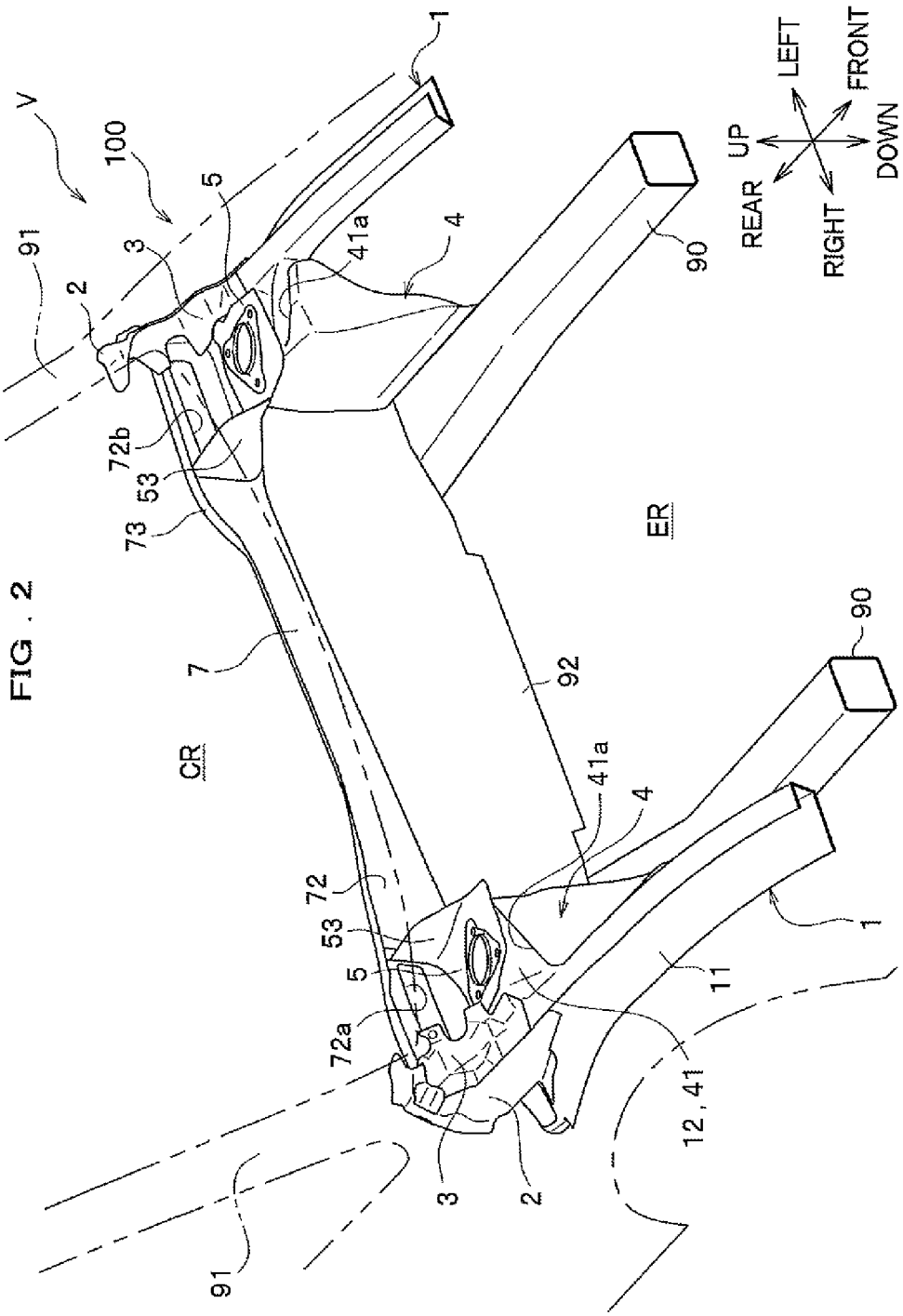
FIG. 2 is a schematic overall perspective view illustrating the vehicle front structure, from which a windshield lower member is removed.
Figure 3:
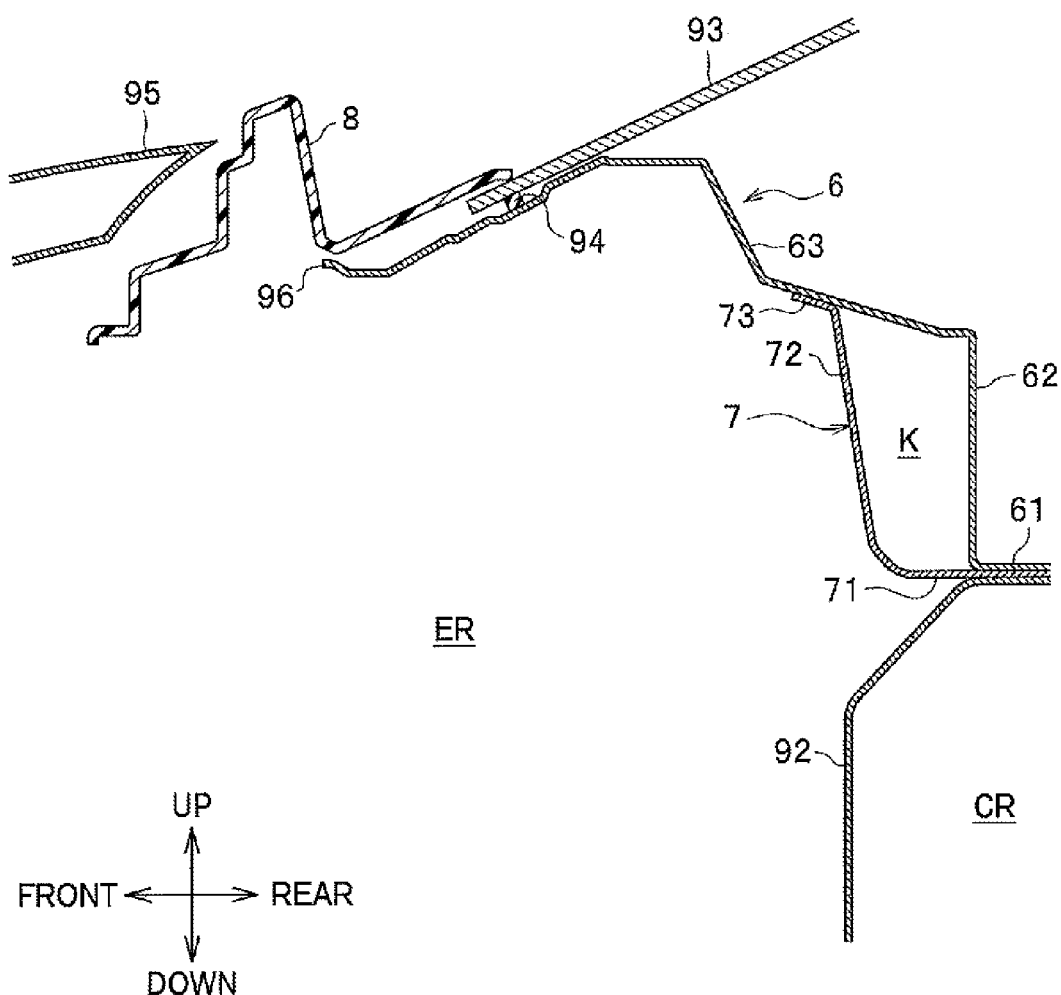
FIG. 3 is a sectional end view taken along line I-I of FIG. 1.

As shown in FIG. 1 to FIG. 3, a structure for a front portion of a vehicle (a vehicle front structure) 100 according to the first embodiment of the present invention mainly includes: upper members 1, side extensions 2, side members 3, damper housings 4, damper housing supports 5, a windshield lower member 6, a cross member 7 (refer to FIG. 2), and a cowl top 8 (refer to FIG. 3).

<Upper Member>

As shown in FIG. 1, the upper members 1 are steel members which are arranged at both left and right sides of the vehicle V and extend in the front-rear direction. The upper member 1 includes: a substantially U-shaped main body portion 11 which is open toward the outside in the vehicle width direction; and a fixation portion 12 which protrudingly extends from the inside close to a rear of the main body portion 11 toward the damper housings 4 in the vehicle width direction and is fixed on the upper end of the damper housings 4.

The main body portion 11 has a front end side fixed to a front side frame 90 which is disposed obliquely below the main body portion 11 and extends in the front-rear direction, with an intervening connecting portion not shown in the drawings. The main body portion 11 has a rear end side fixed to the front end of a front pillar 91. The fixation portion 12 has a portion (top end) which is exposed from a substantially triangular hole 51a formed in the damper housing support 5 described below. The exposed portion has a circular hole 12a extending therethrough. It is noted that the hole 12a is closed with a cap member not shown in the drawings. Also, the front side frame 90 is provided, at the front end thereof, with a bumper beam extension, a front bumper beam and other members, which are not shown in the drawings.

<Side Extension>

As shown in FIG. 1, the side extensions 2 are steel members which are disposed at both left and right sides of the vehicle V and fixed on the rear end sides of the upper members 1. The rear end of the side extension 2 is fixed on the front end of the front pillar 91.

<Side Member>

As shown in FIG. 1, the side members 3 are steel members which are disposed at both the left and right sides of the vehicle V. The front end side of the side member 3 is fixed on the main body portion 11 and the fixation portion 12 of the upper member 1. The rear end side of the side member 3 is fixed on the upper end of the side extension 2. The rear end side of the side member 3 has a wiper pivot hole 3a, extending therethrough, for attaching a wiper not shown in the drawings.

<Damper Housing>

Figure 6:
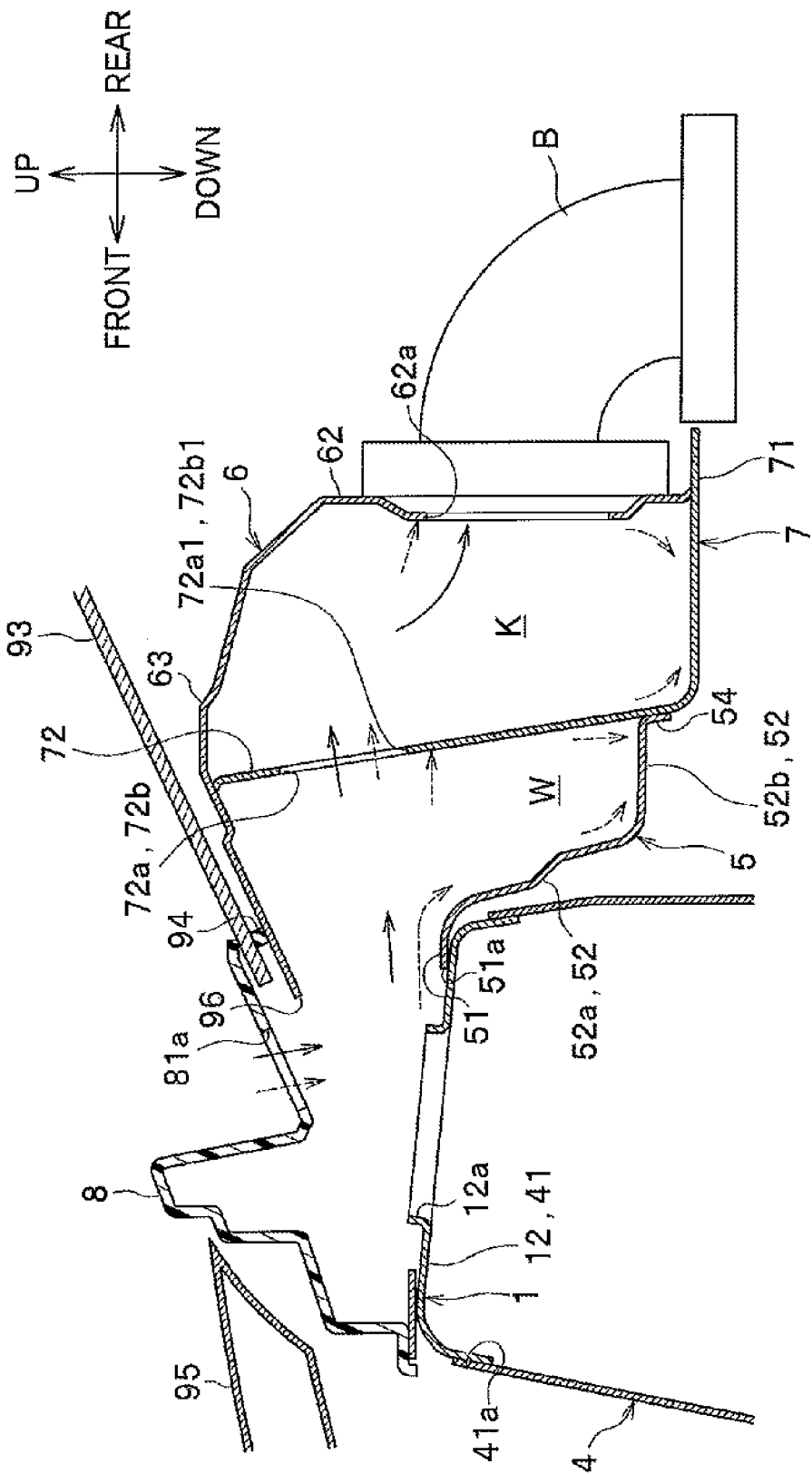
FIG. 6 is a sectional end view taken along line II-II of FIG. 5.

As shown in FIG. 1, the damper housings 4 are steel members which are disposed at both the left and right sides of the vehicle V and house and support dampers not shown in the drawings. As shown in FIG. 2, the damper housings 4 are disposed at the rear end sides, as well as on the vehicle width directional insides of the upper members 1, and disposed at the front of both the left and right ends of the cross members 7. The outer end of the damper housings 4 is fixed on the inside of the main body portion 11 of the upper member 1 in the vehicle width direction. The lower end of the damper housings 4 is fixed on the front side frame 90. As shown in FIG. 6, the damper housings 4 is provided, at the upper surface 41 thereof, with a hole 41a formed extendingly therethrough to expose the upper end of the damper to the outside. The fixation portion 12 of the upper member 1 is arranged to cover the hole 41a from above. In the present embodiment, the fixation portion 12 of the upper member 1 serves as the upper surface 41 of the damper housings 4.

<Damper Housing Support>

Figure 4:
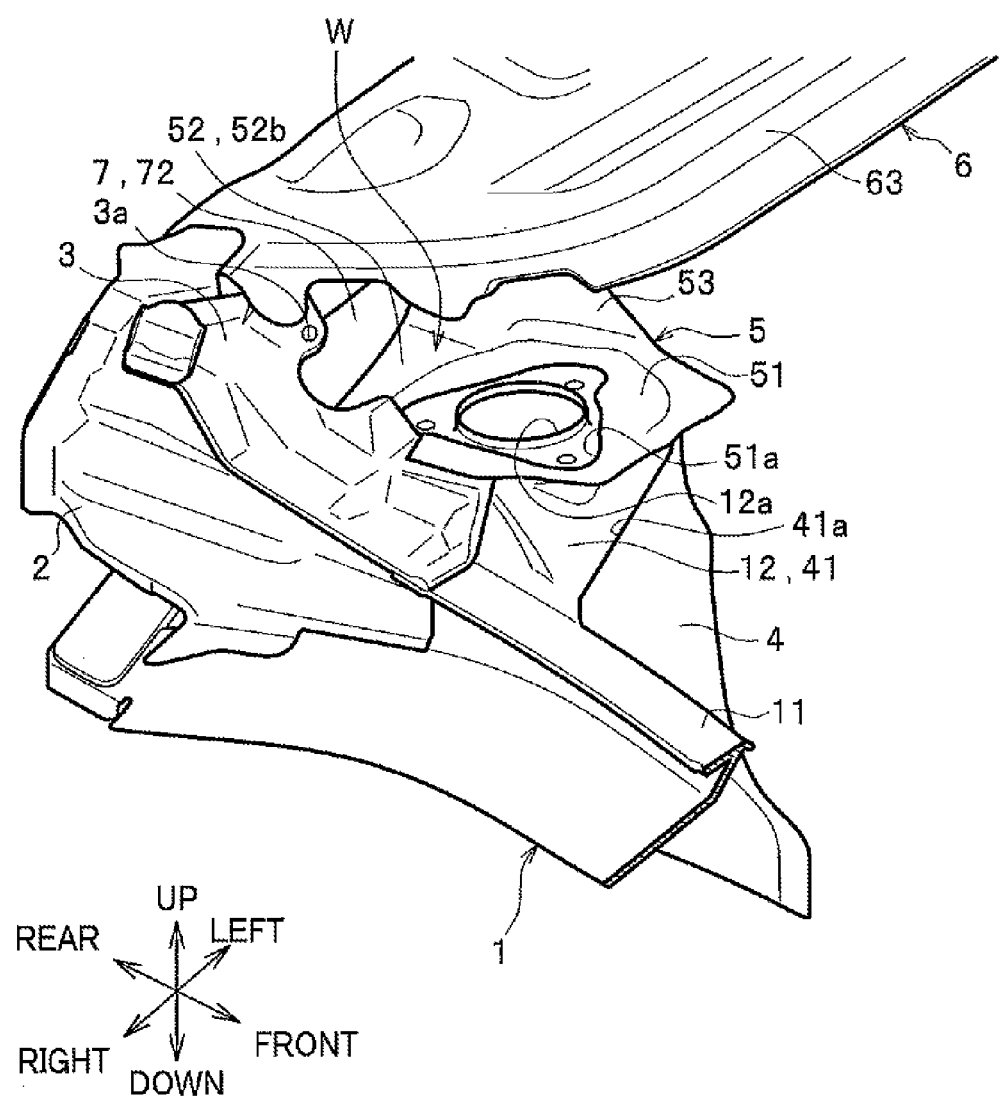
FIG. 4 is a partially enlarged perspective view of FIG. 1.

As shown in FIG. 2, the damper housing supports 5 are steel members which are disposed at both the left and right sides of the vehicle V for connecting the damper housings 4 and the cross member 7. As shown in FIG. 4, the damper housing support 5 includes a damper housing fixation portion 51, a lateral wall portion 52, and a vertical wall portion 53.

As shown in FIG. 6, the damper housing fixation portion 51 is a portion which is fixed on the upper surface 41 of the damper housings 4. As shown in FIG. 4 and FIG. 6, the damper housing fixation portion 51 has a hole 51a formed extendingly therethrough to expose a portion of the fixation portion 12 of the upper member 1.

In the present embodiment, the upper surface 41 of the damper housings 4 and the upper surface of the damper housing fixation portion 51 form a flow regulating surface for the outside air to flow thereon, the outside air being introduced through an outside air introduction openings 81a of the cowl top 8 described below.

Figure 7:
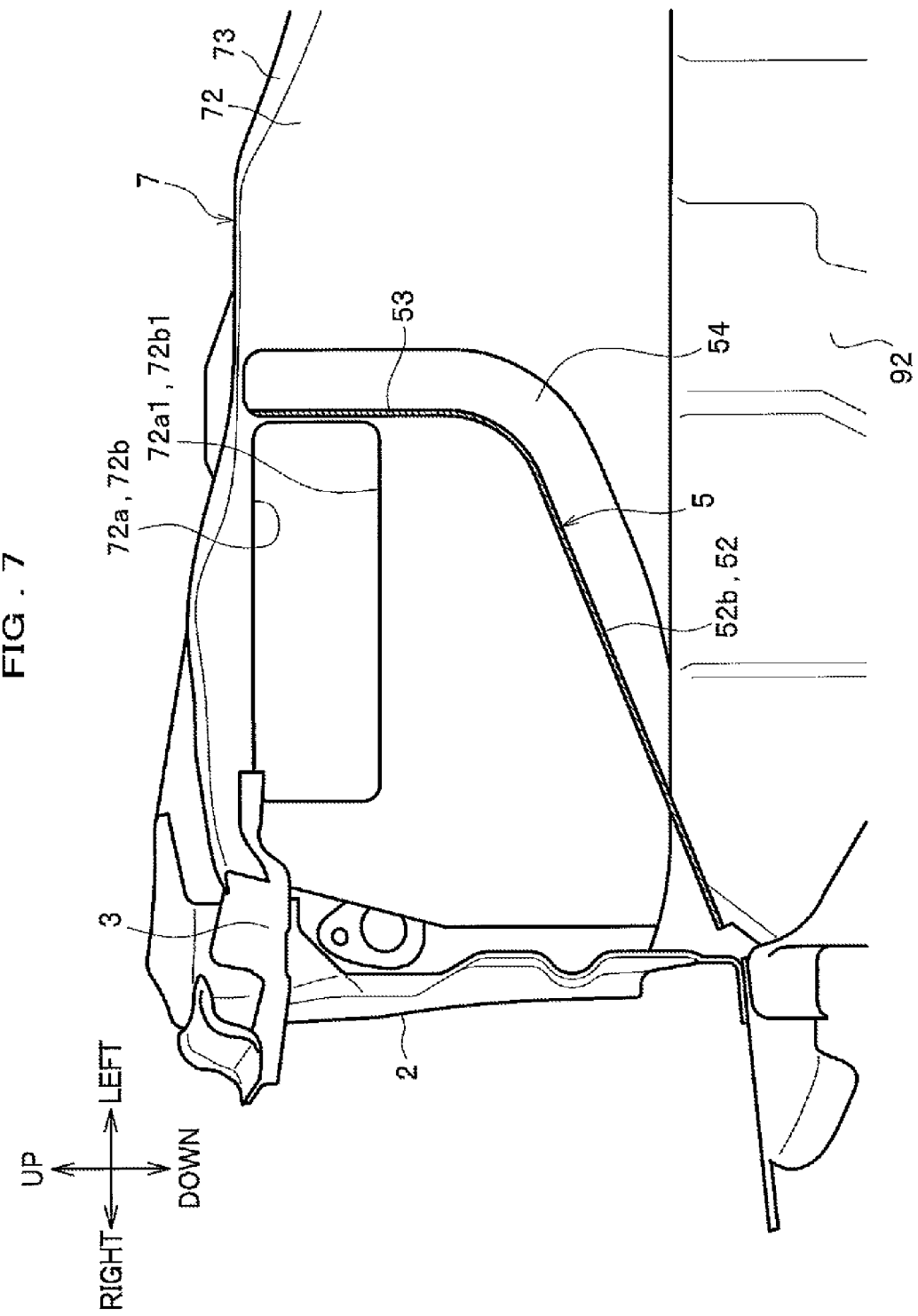
FIG. 7 is a sectional end view take along line III-III of FIG. 5.

As shown in FIG. 6, the lateral wall portion 52 is a portion which protrudingly extends downward and rearward from the rear end of the damper housing fixation portion 51 and is fixed on the vertical wall portion 72 of the cross member 7. The lateral wall portion 52 is disposed behind and above the rear end of the damper housings 4, and extends along the rear end. The lateral wall portion 52 includes: an inclined portion 52a which protrudingly extends in an inclined manner that the inclined portion is positioned to be lower as extending rearward from the rear end of the damper housing fixation portion 51; and a bottom wall portion 52b which protrudingly extends rearward from the rear end of the inclined portion 52a and is fixed on the cross member 7. In the present embodiment, the inclined portion 52a, the bottom wall portion 52b and the vertical wall portion 72 of the cross member 7 form a water drainage groove W, of a recessed shape in sectional view, formed in the left-right direction. As shown in FIG. 7, the bottom wall portion 52b is inclined in such a manner that the bottom wall portion is positioned lower as extending shifts toward the outside in the vehicle width direction.

Figure 5:
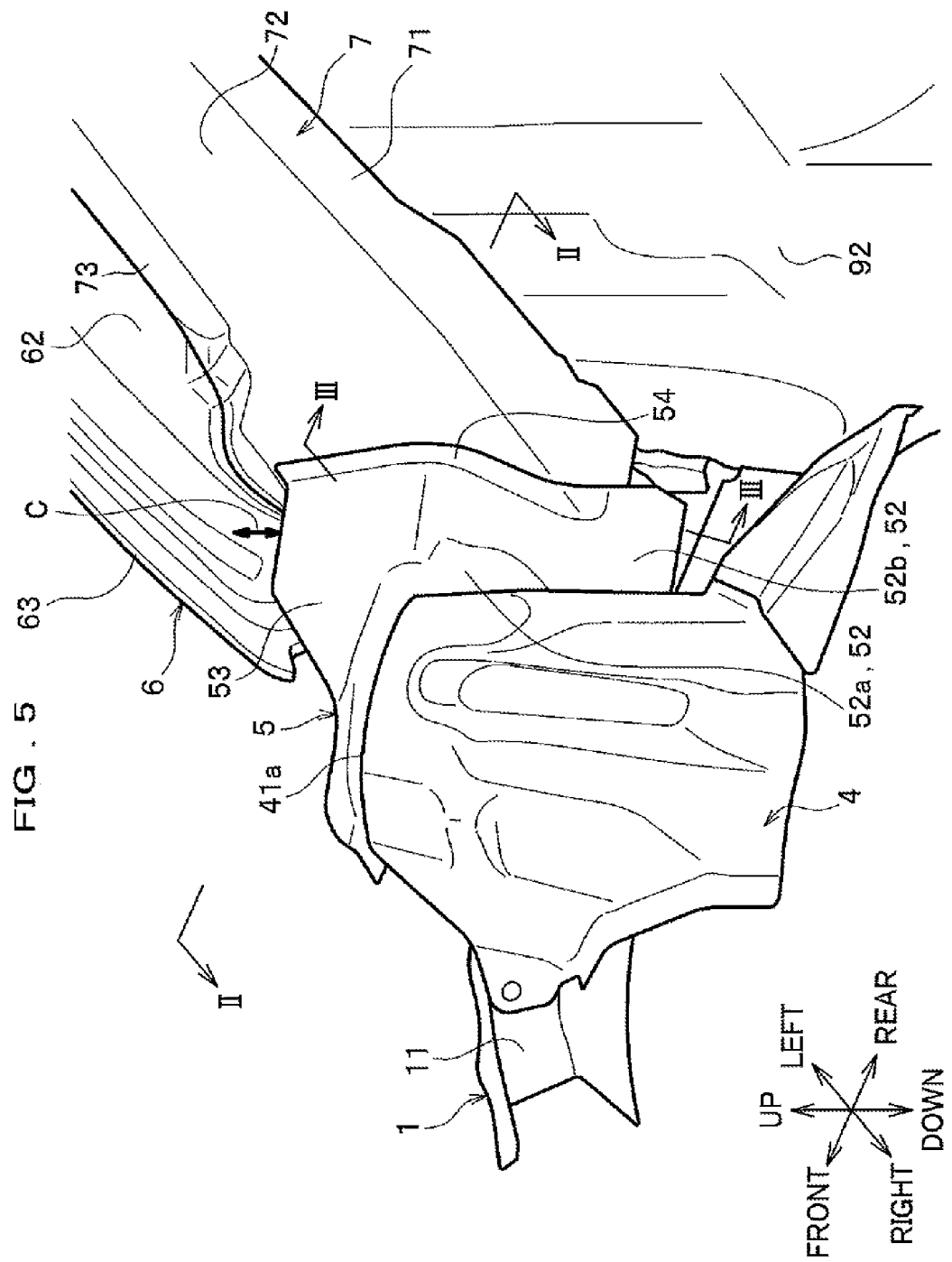
FIG. 5 is a partially enlarged perspective view as viewed from the direction of arrow X shown in FIG. 1.

As shown in FIG. 4 and FIG. 5, the vertical wall portion 53 is a portion which protrudingly extends upward and rearward from the vehicle-width directional inside of the damper housing fixation portion 51 and is fixed on the vertical wall portion 72 of the cross member 7. The vertical wall portion 53 is formed continuously at the vehicle-width directional inside of the lateral wall portion 52, and blocks the water drainage groove W at the inside in the vehicle width direction thereof. That is, the vertical wall portion 53 serves as a water stopper portion for preventing the water, after having flowed into the water drainage groove W, from entering into the inside in the vehicle width direction. As shown in FIG. 5 and FIG. 7, the bottom wall portion 52b and the vertical wall portion 53 have, at the rear ends thereof, a flange portion 54 which is protrudingly extendingly formed and is fixed on the cross member 7. The flange portion 54 is disposed extendingly from the upper end of the vertical wall portion 53 to the proximity of the right end of the bottom wall portion 52b in the direction orthogonal to both of the bottom wall portion 52b and the vertical wall portion 53 (in the up-down direction and the left-right direction).

In the present embodiment, the lateral wall portion 52 and the vertical wall portion 53 serve to drain the water having flowed into from the outside of the vehicle V to the side area of the vehicle V, in cooperation with the vertical wall portion 72 of the cross member 7. Also, the lateral wall portion 52 and the vertical wall portion 53 form a substantially box-like structure (bag structure) to improve the support stiffness of the damper housing support 5 in both the front-rear direction and the up-down direction. Thus, in the present embodiment, the lateral wall portion 52 and the vertical wall portion 53 connect the damper housings 4 and the cross member 7, which are both rigid bodies, to make up a highly rigid body at the front portion of the vehicle. Thereby, an impact load exerted on the upper member 1 at the time of a front collision is smoothly transmitted to the damper housings 4, the damper housing support 5, the cross member 7 and the windshield lower member 6, so that an impact energy is absorbed preferably and the load received by the side extension 2 and the side member 3 is reduced.

<Windshield Lower Member>

As shown in FIG. 3, the windshield lower member 6 is a steel member which is longitudinal in the left-right direction. The windshield lower member 6 is fixed on the upper end of the dashboard lower member 92 separating the engine room ER from the passenger room CR, and protrudingly extends frontward from the upper end to support the front glass 93 at one end thereof. The windshield lower member 6 includes: a flange portion 61 which extends in the front-rear direction and is fixed on the dashboard lower member 92; a vertical wall portion 62 which protrudingly extends upward from the front end of the flange portion 61; and a lateral wall portion 63 which protrudingly extends frontward from the upper end of the vertical wall portion 62 for supporting the lower end of the front glass 93.

Figure 8:
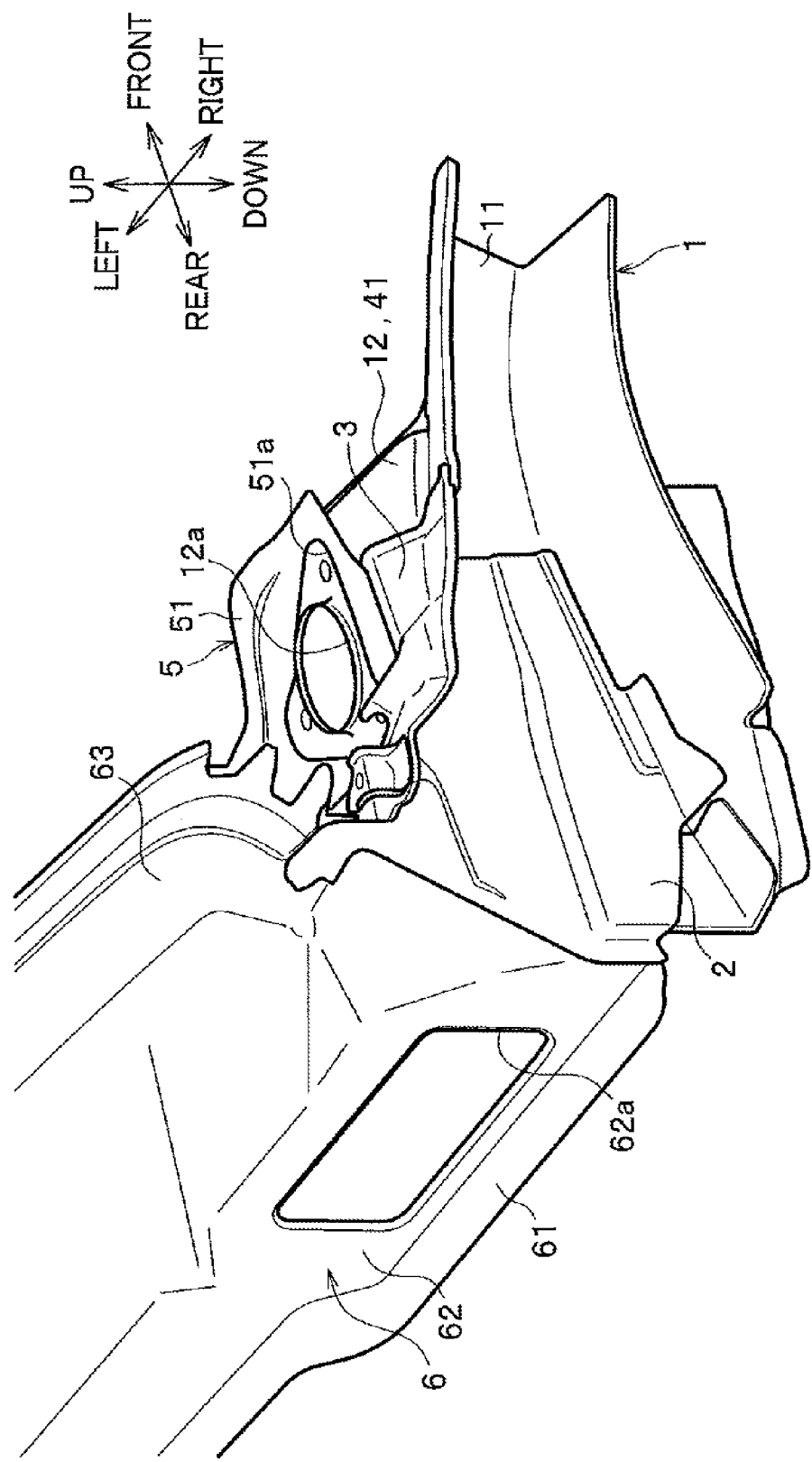
FIG. 8 is a partially enlarged perspective view as viewed from the direction of arrow Y shown in FIG. 1.

The vertical wall portion 62 is a portion placed at a predetermined distance apart from the vertical wall portion 72 of the cross member 7 in a rearward direction. As shown in FIG. 8, the vertical wall portion 62 has, at the right end thereof, a substantially rectangular blower air intake opening 62a. As shown in FIG. 6, the rear of the blower air intake opening 62a is connected to a blower B for supplying the outside air to the passenger room CR (refer to FIG. 3).

As shown in FIG. 6, both the left and right ends of the lateral wall portion 63 are positioned above the damper housing support 5. The lateral wall portion 63 and the front glass 93 are fixed to each other with an adhesive 94. Also, as shown in FIG. 5, there is a predetermined clearance C formed between the front end side of the lateral wall portion 63 and the upper end of the vertical wall portion 53.

<Cross Member>

As shown in FIG. 2, the cross member 7 is a steel member which is longitudinal in the left-right direction and extendingly lies in the vehicle width direction. The cross member 7 is arranged between the front pillars 91, 91 at both left and right sides, with the side extensions 2 interposed therebetween. As shown in FIG. 3, the cross member 7 is fixed on the base end side (rear end side) of the windshield lower member 6, and forms a closed cross section K together with the windshield lower member 6. Thereby, the support stiffness of the base end side of the windshield lower member 6 is improved. The cross member 7 includes: a lower flange portion 71, the rear end side of which is fixed on the upper end of the dashboard lower member 92 and the lateral wall portion 63 of the windshield lower member 6; a vertical wall portion 72 which protrudingly extends upward from the front end of the lower flange portion 71; and an upper flange portion 73 which protrudingly extends frontward from the upper end of the vertical wall portion 72 and is fixed on the rear end side of the lateral wall portion 63.

As shown in FIG. 3 and FIG. 6, the vertical wall portion 72 is a portion structured such that the vertical dimensions at both left and right end sides are larger than the vertical dimension at the center side in the vehicle width direction. As shown in FIG. 2 and FIG. 6, both left and right ends of the vertical wall portion 72 face the lateral wall portion 52 and the vertical wall portion 53 of the damper housing support 5. Both the left and right end sides of the vertical wall portion 72 have a pair of substantially rectangular outside air intake openings 72a, 72b for the outside air to pass therethrough, respectively. As shown in FIG. 6, the lower edges 72a1, 72b1 of the outside air intake openings 72a, 72b are positioned above the upper surface 41 of the damper housings 4 and the upper surface of the damper housing fixation portion 51. As shown in FIG. 7, the outside air intake openings 72a, 72b are positioned at the vehicle width directional outside of the vertical wall portion 53 of the damper housing support 5.

<Blower Air Intake Opening, Outside Air Intake Opening>

Here, referring to FIG. 6 and FIG. 9, the relationship between the blower air intake opening 62a and the outside air intake opening 72a will be explained.

Figure 9:
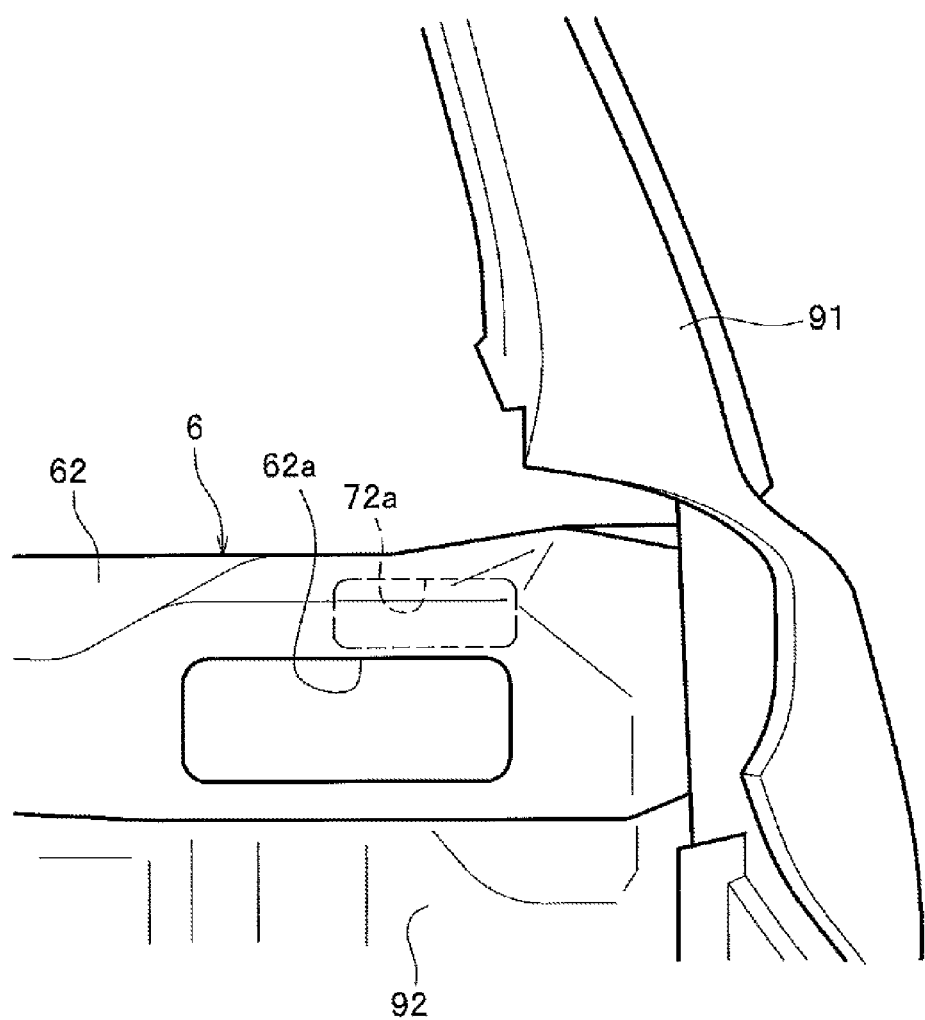
FIG. 9 is a back view of the vehicle front structure.

As shown in FIG. 6 and FIG. 9, in the present embodiment, the blower air intake opening 62a is disposed at a position corresponding to the outside air intake opening 72a at the right side. In other words, the blower air intake opening 62a is disposed in the right area at an offset position with respect to the center line extending in the front-rear direction and passing through the center in the vehicle width direction of the cross member 7. The blower air intake opening 62a is positioned below the outside air intake opening 72a. In the present embodiment, the windshield lower member 6 and the cross member 7 define a vertically-long closed cross section K, and the positions of the blower air intake opening 62a and the outside air intake opening 72a are offset from each other vertically.

Also, the blower air intake opening 62a is disposed at a position not lapping with the outside air intake opening 72a as viewed in the vehicle front-rear direction. In other words, the blower air intake opening 62a is disposed at a position not lapping with the outside air intake opening 72a, if the blower air intake opening 62a is projected on the vertical wall portion 72 of the cross member 7. It is noted that, in the present embodiment, the closed cross section K is vertically long in a vertical sectional view, and serves as an air intake path which has the pair of left and right outside air intake openings 72a, 72a communicate with the blower air intake opening 62a.

<Cowl Top>

As shown in FIG. 6, the cowl top 8 is a plastic member which covers the opening 96 formed between the windshield lower member 6 and the engine hood 95. The cowl top 8 is fixed on the windshield lower member 6 to form what is called a cowl box together with the windshield lower member 6. At both left and right end sides of the cowl top 8, outside air introduction openings 81a for introducing the outside air from outside of the vehicle V are formed extendingly therethrough.

According to the first embodiment of the present invention, the vehicle front structure 100 is basically structured as above. Next, referring to FIG. 6 and FIG. 10, its behavior and effect will be described.

Figure 10:
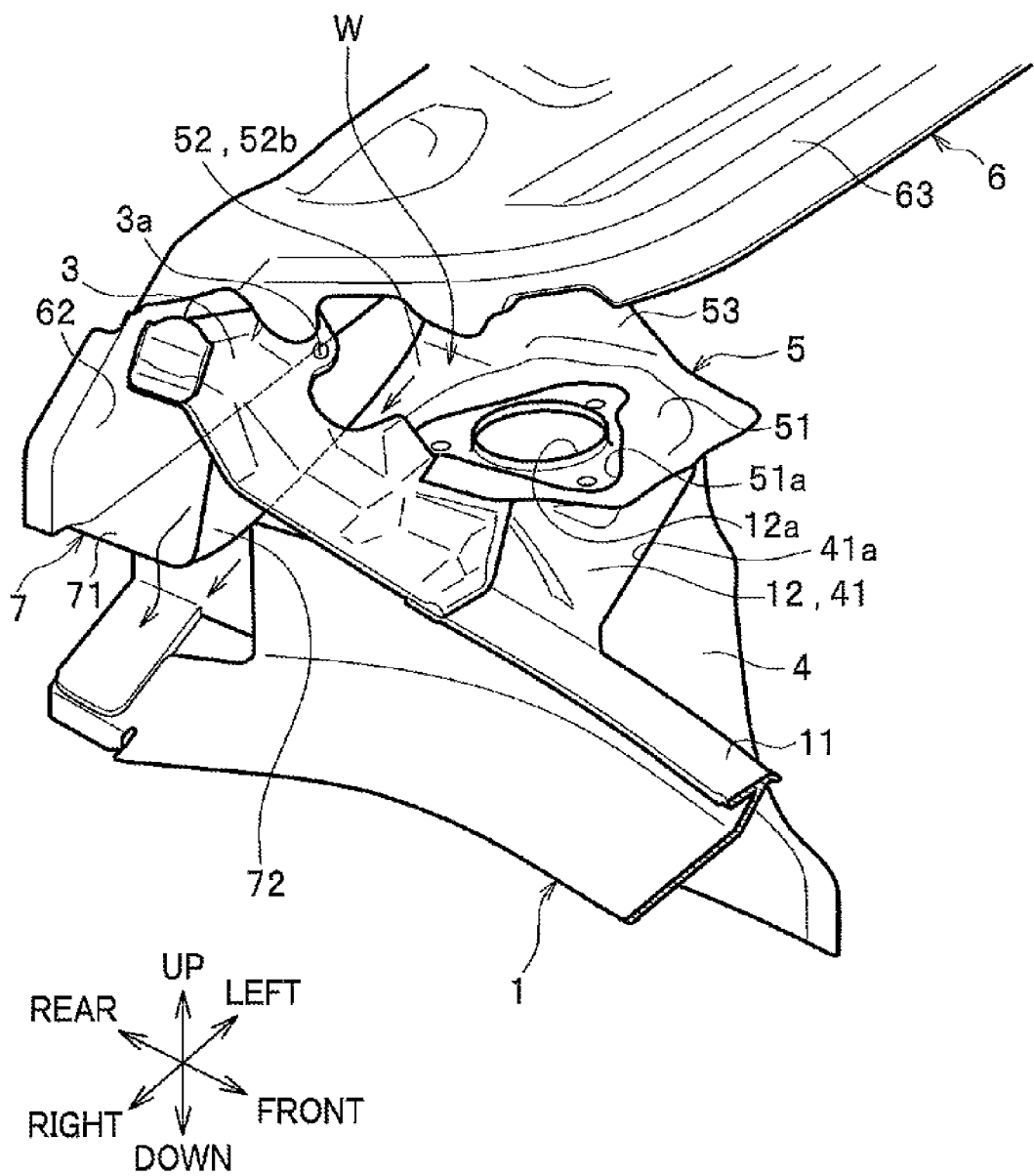
FIG. 10 is a partially enlarged perspective view schematically illustrating a side area of the vehicle front structure from which water drains.

It is noted that the arrows each depicted with a solid line in FIG. 6 represent an air flow, and the arrows each depicted with a dashed line represent a water flow. Also, the arrows each depicted with a solid line in FIG. 10 represent a water flow.

As shown in FIG. 6, the outside air is introduced from the outside air introduction openings 81a at both left and right sides of the cowl top 8 to be taken into the blower B through the pair of left and right outside air intake openings 72a, 72b, the closed cross section K and the blower air intake opening 62a. Then, the outside air is taken into the passenger room CR through the blower B.

On the other hand, as shown in FIG. 6, the water (for example, water used to wash the vehicle, rain water and the like) flows in either from the outside air introduction openings 81a of the cowl top 8 at both left and right sides, or from the wiper pivot hole 3a (refer to FIG. 4). The water is either guided directly from the upper surface 41 of the damper housings 4 and the upper surface of the damper housing fixation portion 51 to the lateral wall portion 52 of the damper housing support 5, or guided to the lateral wall portion 52 after hitting the vertical wall portion 72 of the cross member 7. Thereafter, the water flows down on the bottom wall portion 52b of the lateral wall portion 52 to be drained to the left and right side areas of the vehicle V as shown in FIG. 10.

At this time, as shown in FIG. 6, the lower edge 72a1 of the outside air intake opening 72a of the cross member 7 is positioned above the flow regulating surface, on which the outside air flows, and which is defined by the fixation portion 12 of the upper member 1 and the upper surface of the damper housing fixation portion 51. Thereby, the water, the mass of which is greater than the mass of the outside air, is more likely to hit the vertical wall portion 72 of the cross member 7, which achieves efficient gas-liquid separation.

Also, as shown in FIG. 6, the blower air intake opening 62a is disposed at a position not lapping with the outside air intake opening 72a as viewed in the vehicle front-rear direction, and the water hits the vertical wall portion 62 of the windshield lower member 6 at the upper portion from the blower air intake opening 62a, even when the water passes through the outside air intake opening 72a. Then, as shown in FIG. 10, the water after having flowed into the closed cross section K flows down on the lower flange portion 71 of the cross member 7 to be drained to the left and right side areas of the vehicle V.

According to the present embodiment described above, the cross member 7 includes the pair of left and right outside air intake openings 72a, 72b for the outside air to pass therethrough. The windshield lower member 6 includes the blower air intake opening 62a connected to the blower B. The closed cross section K formed by the windshield lower member 6 and the cross member 7 serves as an air intake path which has the pair of left and right outside air intake openings 72a, 72b communicate with the blower air intake opening 62a. Thereby, the outside air is taken into the blower B, through the pair of left and right outside air intake openings 72a, 72b, the closed cross section K and the blower air intake opening 62a. Accordingly, a sufficient amount of the outside air is supplied into the room (passenger room CR), while the flow speed of the outside air from the outside air intake opening 72b, which does not face toward the blower air intake opening 62a, is decreased to reduce power consumption of the blower B.

According to the present embodiment, the inclined portion 52a and the bottom wall portion 52b of the lateral wall portion 52 and the cross member 7 form the water drainage groove W of a recessed shape in a sectional view, which extends in the left-right direction. Additionally, the vertical wall portion 53 is provided at the inside in the vehicle width direction of the water drainage groove W. Thereby, the water after having flowed from the outside of the vehicle V is either guided directly to the lateral wall portion 52 of the damper housing support 5, or guided to the lateral wall portion 52 after hitting the vertical wall portion 72 of the cross member 7, and thereafter the water flows down on the bottom wall portion 52b of the lateral wall portion 52 to be drained to the side areas of the vehicle V, in order to achieve satisfactory gas-liquid separation.

Particularly, in the present embodiment, the lower edge 72a1 of the outside air intake opening 72a of the cross member 7 is positioned above the flow regulating surface defined by the upper surface 41 of the damper housings 4 and the upper surface of the damper housing fixation portion 51, and the water, the mass of which is greater than the mass of the outside air, is more likely to hit the vertical wall portion 72 of the cross member 7, which achieves efficient gas-liquid separation.

Further, in the present embodiment, the bottom wall portion 52b of the lateral wall portion 52 is inclined downwardly in such a manner that it is positioned to be lower as extending toward the outside in the vehicle width direction. Therefore, the water having been guided to the bottom wall portion 52b flows down on the bottom wall portion 52b by its own weight to be preferably drained to the side area of the vehicle V.

Also, according to the present embodiment, the blower air intake opening 62a is disposed at a position not lapping with the outside air intake opening 72a as viewed in the vehicle front-rear direction. Therefore, the water hits the vertical wall portion 62 of the windshield lower member 6 even when the water passes through the outside air intake opening 72a, which prevents the water from entering into the blower air intake opening 62a and achieves satisfactory gas-liquid separation.

Particularly, in the present embodiment, the blower air intake opening 62a is positioned below the outside air intake opening 72a. Even when the water passes through the outside air intake opening 72a, the water hits the vertical wall portion 62 of the windshield lower member 6 at the upper portion from the blower air intake opening 62a, which securely prevents the water from entering into the blower air intake opening 62a.

According to the present embodiment, a satisfactory gas-liquid separation is performed by the lateral wall portion 52 and the vertical wall portion 53 of the damper housing support 5, the vertical wall portion 72 of the cross member 7, and the vertical wall portion 62 of the windshield lower member 6. Thereby, the conventionally utilized dashboard upper member of a large cross-sectional dimension is unnecessary, which lowers, by that amount, the windshield lower member 6, the cowl top 8 and other members, thereby improving the frontward visibility from the vehicle V.

Also, according to the present embodiment, the water drainage groove W is disposed between the cross member 7 and the damper housings 4. The engine hood 95 disposed above the damper housings 4 is lowered as compared to a case where the water drainage groove W is arranged on the damper housings 4. Also, the outside air intake openings 72a, 72b for allowing the passage of the outside air are disposed at both left and right ends of the cross member 7, which has the duct unnecessary, thereby lowering the engine hood 95 by that amount.

According to the present embodiment, the dashboard upper member of a large cross-sectional dimension is unnecessary and, by that amount, the windshield lower member 6, the cowl top 8 and other members are arranged at a more front position. Thereby, the front glass 93 is arranged at a more front position, and thus expanding the room space.

Also, according to the present embodiment, the damper housing support 5 connects the damper housings 4 and the cross member 7, which improves the support stiffness of the damper housings 4.

In the above, the embodiment of the present invention has been described in detail with reference to drawings. However, the present invention is not limited thereto, but may be changed as appropriate within the scope not departing from the spirit of the invention.

In the present embodiment, the windshield lower member 6 and other members for constituting the vehicle front structure 100 are made of steel members. However, the present invention is not limited thereto, but they may be formed by press forming metal plate members of other metal such as aluminum plate.

In the present embodiment, the blower air intake opening 62a is arranged at a position corresponding to the outside air intake opening 72a of right side. However, the present invention is not limited thereto, but it may be arranged at a position corresponding to the outside air intake opening 72b of left side, or it may be arranged between the outside air intake openings 72a, 72b of left and right sides (for example, at the center of the windshield lower member 6 in the vehicle width direction).

In the present embodiment, the blower air intake opening 62a and the outside air intake openings 72a, 72b are formed in a rectangular shape. However, the present invention is not limited thereto, but they may be formed in other shapes such as a circular shape, for example.

Next, referring to FIG. 11 to FIG. 22, the vehicle front structure 110 according to the second embodiment of the present invention will be described. In the description, differences from the first embodiment will be described in detail. The same reference numerals are given to the same elements as in the first embodiment, and redundant description is omitted. In the vehicle front structure 110 according to the second embodiment, the damper housing support 5, the windshield lower member 6, the cross member 7 and the cowl top 8 are structured differently from those in the first embodiment.

<Damper Housing Support>

Figure 14:
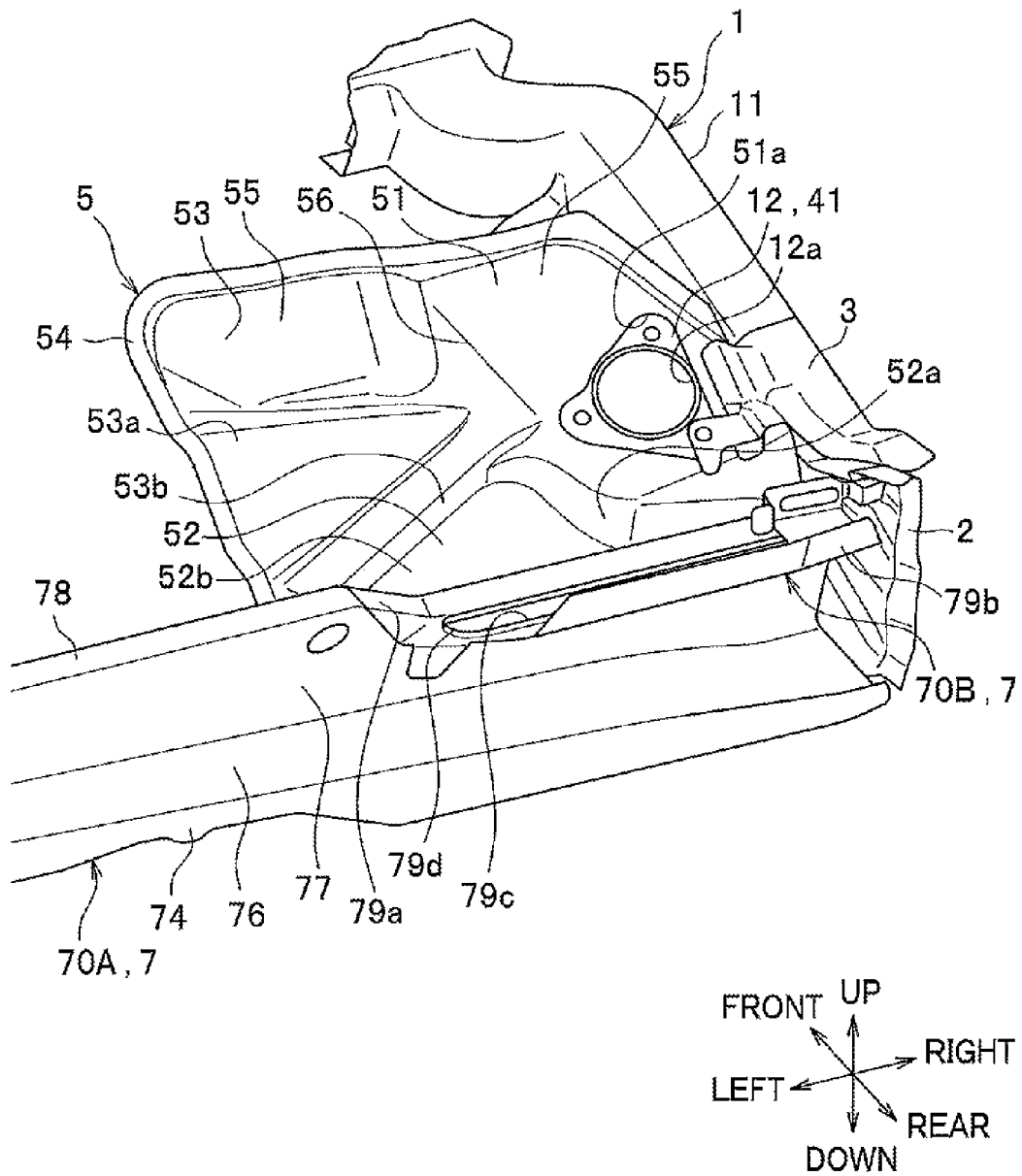
FIG. 14 is a partially enlarged perspective view illustrating the vehicle front structure, from which a windshield lower member is removed, as viewed down from obliquely leftward and rearward.
Figure 15:
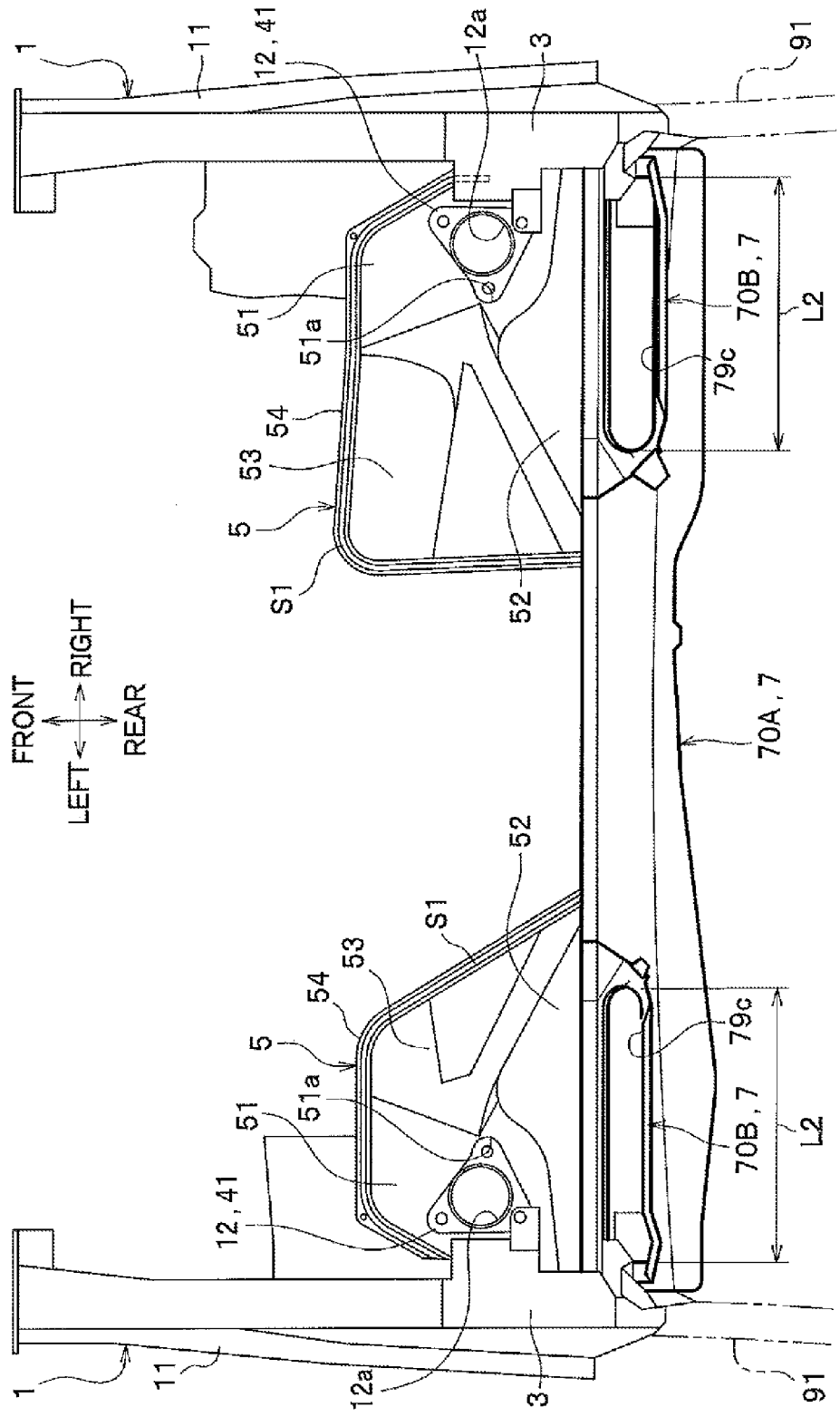
FIG. 15 is a plan view illustrating the vehicle front structure, from which the cowl top and the windshield lower member are removed.

As shown in FIG. 15, the damper housing supports 5 are disposed in front of the upper surface 41 of the damper housings 4, and arranged to be widened toward the inside in the vehicle width direction relative to the upper surface 41 of the damper housings 4. The damper housing support 5 at right side is formed in a substantially rectangle in a plan view, and the damper housing support 5 at left side is formed in a substantially trapezoid in a plan view. As shown in FIG. 14, the damper housing support 5 includes the damper housing fixation portion 51, the lateral wall portion 52, the vertical wall portion 53 and the flange portion 54. It is noted that the shape of the damper housing support 5 may be changed as appropriate. It is preferred that the damper housing support 5 at the right side is formed in a substantially rectangle or a substantially trapezoid in a plan view, having a front end wider than the upper surface 41 of the damper housings 4.

The damper housing fixation portion 51 is a portion to which the upper surface 41 of the damper housings 4 is fixed. The vertical wall portion 53 includes: an upper wall portion 53a which is continuously arranged from the vehicle width directional inside of the damper housing fixation portion 51 so as to extend rearward; and a side wall portion 53b which extends vertically downward from the rear end of the upper wall portion 53a. The damper housing fixation portion 51 and the upper wall portion 53a of the vertical wall portion 53 are respectively provided with inclined surfaces (first inclined surfaces) 55 which are inclined in such a manner that they are positioned to be lower as coming closer to a boundary therebetween. Thereby, around the center of the damper housing support 5, a downwardly recessed portion 56 is extendingly arranged in the front-rear direction. The recessed portion 56 is inclined in such a manner that it is positioned to be lower as extending from front to rear. The rear end of the recessed portion 56 extends continuously to the upper end of the lateral wall portion 52. In the present embodiment, the upper surface 41 of the damper housings 4, the upper surface of the damper housing fixation portion 51 and the upper surface of the vertical wall portion 53 serve as a flow regulating surface on which the outside air flows after being introduced from an outside air introduction openings 81a of the cowl top 8 described below.

Figure 18:
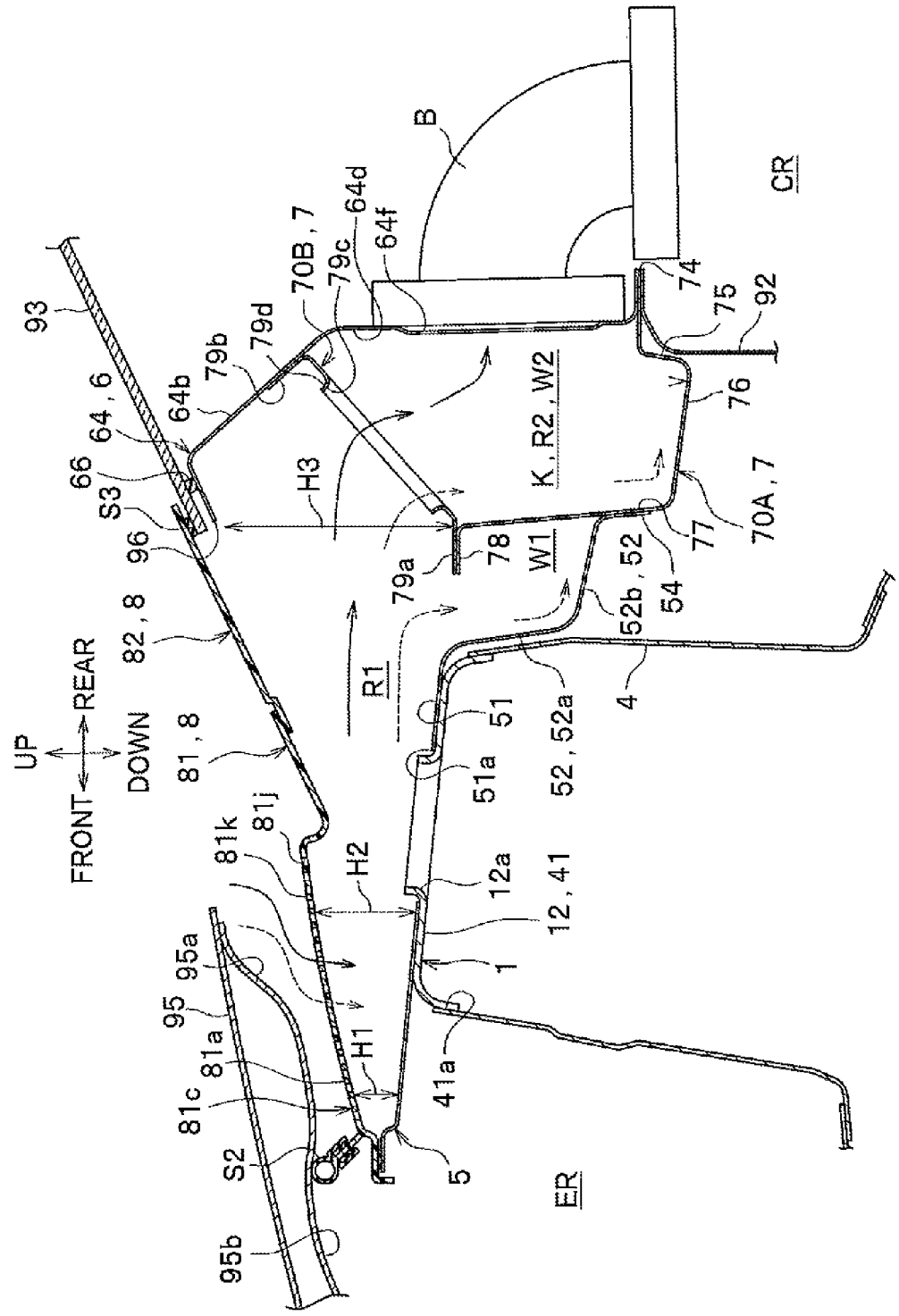
FIG. 18 is a sectional end view taken along line V-V of FIG. 16.

The lateral wall portion 52 is a portion which extends downward and rearward from the rear end of the damper housing fixation portion 51. As shown in FIG. 18, the lateral wall portion 52 is disposed behind the rear end of the upper wall portion of the damper housings 4, and extendingly lies along the same rear end. The lateral wall portion 52 includes: an inclined portion 52a which extends in an inclined manner that it is positioned to be lower as extending rearward from the rear end of the damper housing fixation portion 51; and a bottom wall portion 52b which extends and protrudes rearward from the rear end of the inclined portion 52a and is fixed to the cross member 7. In the present embodiment, the inclined portion 52a, the bottom wall portion 52b and the front side of the vertical wall portion 77 of the cross member 7 form a first water drainage path W1 of a recessed shape in a sectional view, extending in the left-right direction. The bottom wall portion 52b is inclined in such a manner that it is positioned to be lower as extending shifts outward in the vehicle width direction. The lateral wall portion 52 is blocked, at the inside in the vehicle width direction thereof, by the side wall portion 53b of the vertical wall portion 53 (refer to FIG. 13). Thereby, the water after having flowed into the first water drainage path W1 is prevented from flowing inwardly in the vehicle width direction.

Figure 13:
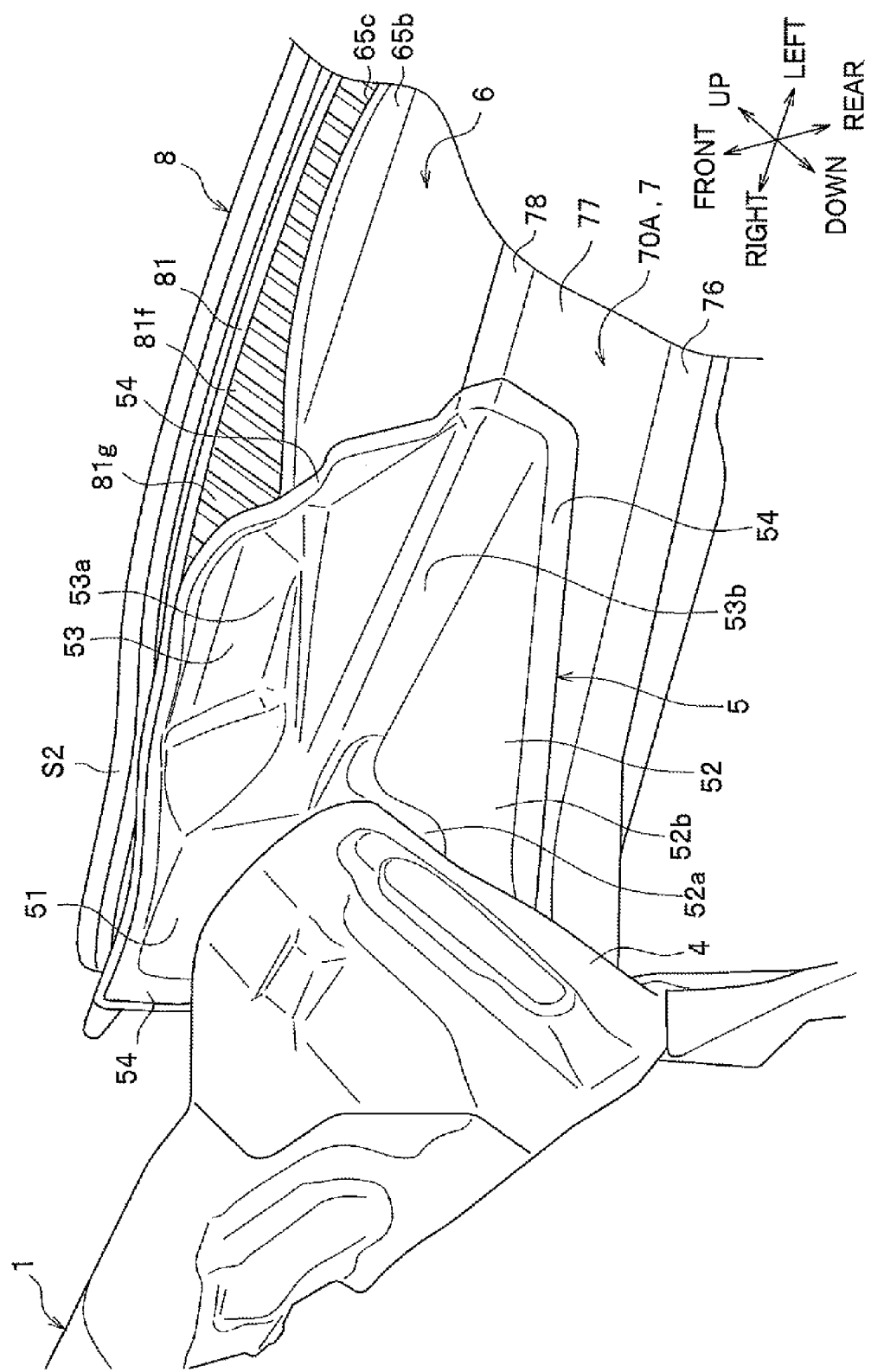
FIG. 13 is a partially enlarged perspective view illustrating a right side of the vehicle front structure, as viewed up from obliquely leftward and frontward.

As shown in FIG. 13 and FIG. 14, the flange portion 54 extends in the up-down direction and in the left-right direction, over substantially the outer periphery of the damper housing support 5. As shown in FIG. 13, the flange portion 54 formed in the bottom wall portion 52b of the lateral wall portion 52 and in the side wall portion 53b of the vertical wall portion 53 is fixed to the cross member main body 70A by welding or the like. As shown in FIG. 15, the flange portion 54 formed in the damper housing fixation portion 51 and in the upper wall portion 53a of the vertical wall portion 53 is provided with a seal S1. The seal (first seal) S1 serves to seal between the damper housing support 5 and the windshield lower member 6 and between the damper housing support 5 and the cowl top 8 in a liquid-tight and air-tight manner.

<Windshield Lower Member>

Figure 12:
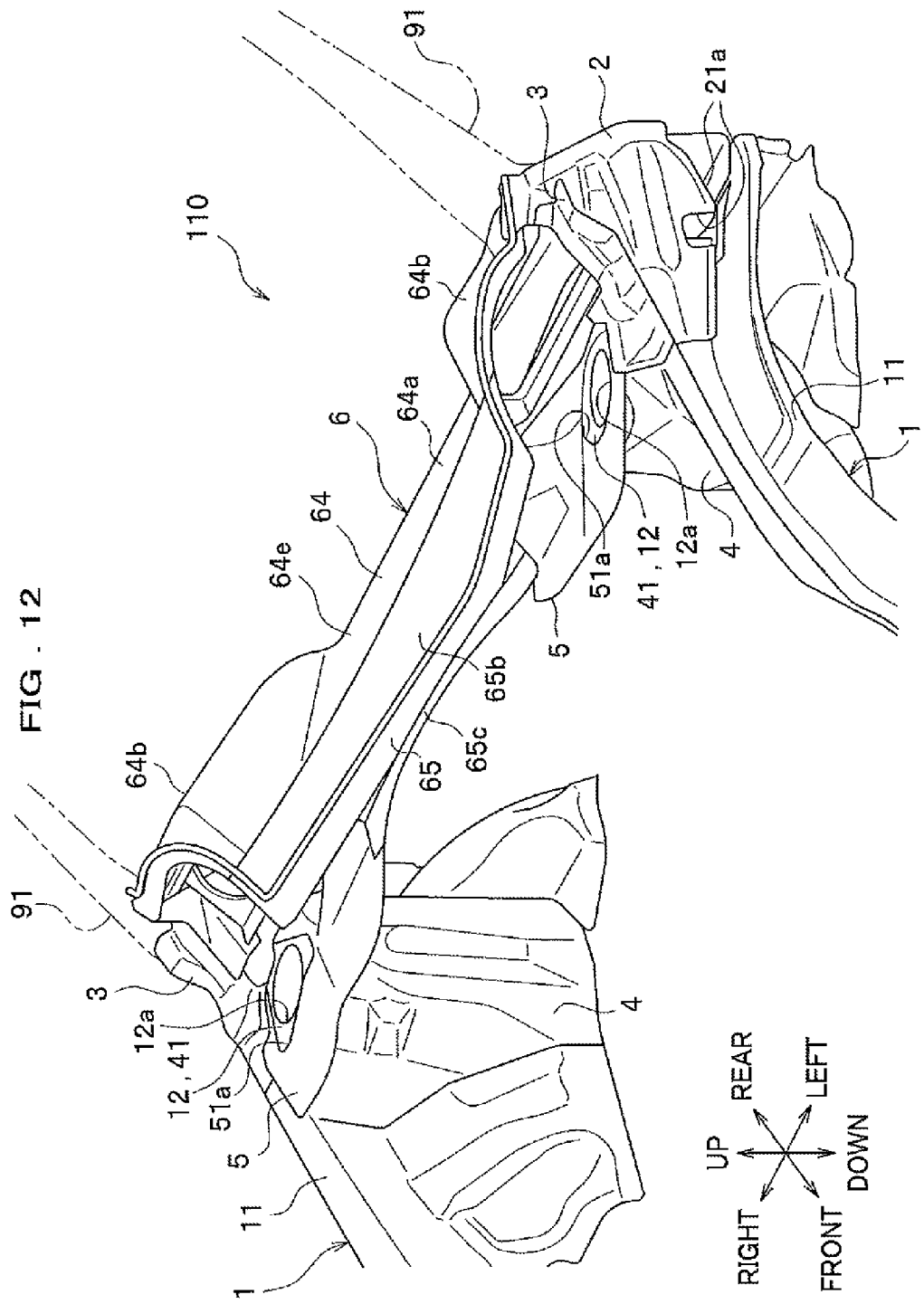
FIG. 12 is a schematic overall perspective view illustrating the vehicle front structure, from which a cowl top and an engine hood are removed, as viewed down from obliquely leftward and frontward.

As shown in FIG. 12, the windshield lower member 6 includes: a windshield lower member main body 64; and a support member 65 which is formed separately from the windshield lower member main body 64 and disposed at the front end side and at the vehicle width directional center side of the windshield lower member main body 64. The support member 65 is structured to be shorter than the windshield lower member main body 64 in the vehicle width direction.

The windshield lower member main body 64 is a member which is fixed on the upper end of the dashboard lower member 92 for separating the engine room ER from the passenger room CR, and protrudingly extends frontward from the same upper end.

Figure 17:
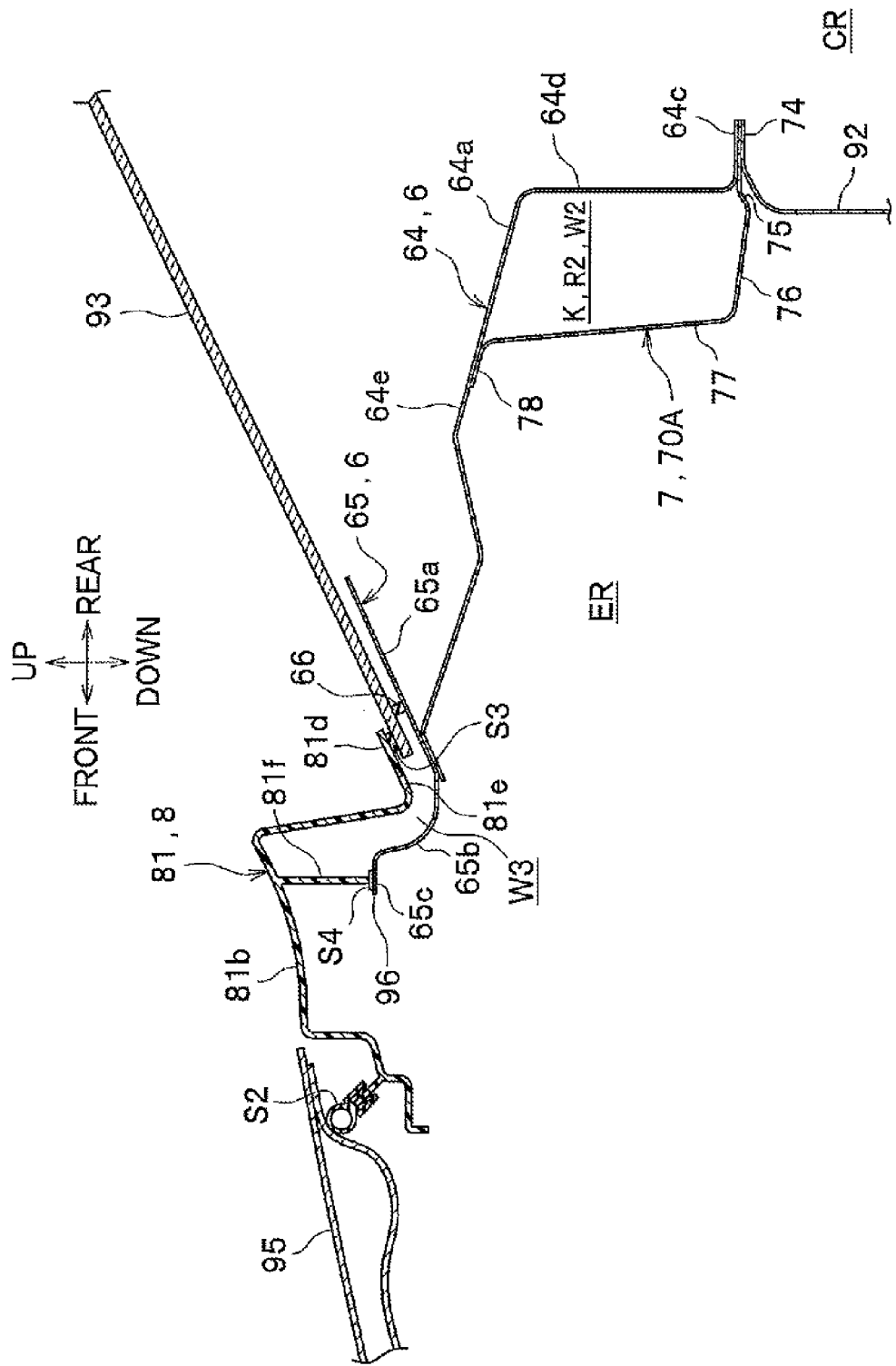
FIG. 17 is a sectional end view taken along line IV-IV of FIG. 16.

As shown in FIG. 17, the windshield lower member main body 64 includes: a flange portion 64c which extends in the front-rear direction and is fixed on the dashboard lower member 92; a vertical wall portion 64d which extends upward from the front end of the flange portion 64c; and a lateral wall portion 64e which extends frontward from the upper end of the vertical wall portion 64d.

As shown in FIG. 12, the windshield lower member 6 has, at both left and right end sides thereof, a pair of bulge portions 64b bulging (protruding) above the center portion 64a, respectively. As shown in FIG. 18, the lower end side of the bulge portion 64b is arranged at a predetermined distance apart from the front vertical wall portion 77 of the cross member 7 in the rearward direction. At the lower end side of the rear of the bulge portion 64b at right side, a blower air intake opening 64f of a substantially rectangular shape is open. To the rear of the blower air intake opening 64f, the blower B for supplying the outside air to the passenger room CR (refer to FIG. 17) is connected.

As shown in FIG. 17, the support member 65 is a member which supports the front glass 93 from downward. The support member 65 includes: an inclined wall portion 65a which is fixed to the lower surface of the front glass 93; a front wall portion 65b which extends frontward from the front end of the inclined wall portion 65a and then extends upward; and a flange portion 65c which extends frontward from the upper end of the front wall portion 65b. The inclined wall portion 65a is fixed on the windshield lower member main body 64 at appropriate places by welding, bolts or the like. The front wall portion 65b is a groove-like portion which extends frontward beyond the front glass 93, and serves as a third water drainage path W3 for draining the water that flows down from the front glass 93 to the damper housing support 5. In the present embodiment, the front wall portion 65b and the flange portion 65c constitute the "extending portion" in the claims. It is noted that the windshield lower member 6 and the front glass 93 are fixed with each other by an adhesive 66.

<Cross Member>

As shown in FIG. 15, the cross member 7 includes: a cross member main body 70A disposed between the front pillars 91 at both left and right sides; and reinforcement members 70B disposed at both vehicle width directional end sides of the cross member main body 70A.

As shown in FIG. 17, the cross member main body 70A is fixed on the base end side (rear end side) of the windshield lower member main body 64, and forms a closed cross section K extending in the vehicle width direction together with the windshield lower member main body 64. The closed cross section K, as described below, serves as a second air intake path R2 communicating between the outside air introduction openings 81a at left side and the blower air intake opening 64f, and also serves as a second water drainage path W2 for draining the water that passes through an outside air intake opening 79c to the side area of the vehicle V.

The cross member main body 70A includes: a lower flange portion 74; a rear vertical wall portion 75 which protrudingly extends downward from the front end of the lower flange portion 74; a lateral wall portion 76 which extends obliquely frontward and upward from the lower end of the rear vertical wall portion 75; a front vertical wall portion 77 which extends obliquely frontward and upward from the front end of the lateral wall portion 76; and an upper flange portion 78 which extends obliquely frontward and upward from the upper end of the front vertical wall portion 77. The center side of the lower flange portion 74 in the vehicle width direction is fixed on the upper end of the dashboard lower member 92 and on the flange portion 64c of the windshield lower member main body 64. The center side of the upper flange portion 78 in the vehicle width direction is fixed on the lateral wall portion 64e of the windshield lower member main body 64.

As shown in FIG. 18, both the end sides of the lower flange portion 74 in the vehicle width direction are fixed on the upper end of the dashboard lower member 92 and on the lower end of the bulge portion 64b. The lateral wall portion (the lower wall portion) 76 forms the bottom surface of the closed cross section K, and is inclined downwardly in such a manner that it is positioned to be lower as extending toward the outside in the vehicle width direction. Both the left and right ends of the front vertical wall portion 77 are each arranged to face toward the lateral wall portion 52 of the damper housing support 5.

As shown in FIG. 18, the reinforcement member 70B is a steel member which is disposed between the windshield lower member main body 64 and the cross member main body 70A to reinforce the both vehicle width directional end sides of the windshield lower member main body 64. The reinforcement member 70B is formed separately from the cross member main body 70A, and is disposed in an inclined manner that it is positioned to be higher as extending from front to rear. The reinforcement member 70B has, at the front end thereof, a front flange portion 79a fixed on the upper flange portion 78 of the cross member main body 70A. The reinforcement member 70B has, at the rear end thereof, a rear flange portion 79b fixed on the inner surface of the bulge portion 64b. The reinforcement member 70B has, at the center thereof, an outside air intake opening 79c of a substantially rectangular shape for allowing passage of the outside air. The periphery of the outside air intake opening 79c is formed with a protrusion 79d protruding obliquely frontward and upward. It is noted that, in the present embodiment, the cross member main body 70A is formed separately from the reinforcement member 70B, but the cross member main body 70A may be formed integrally with the reinforcement member 70B.

<Cowl Top>

Figure 16:
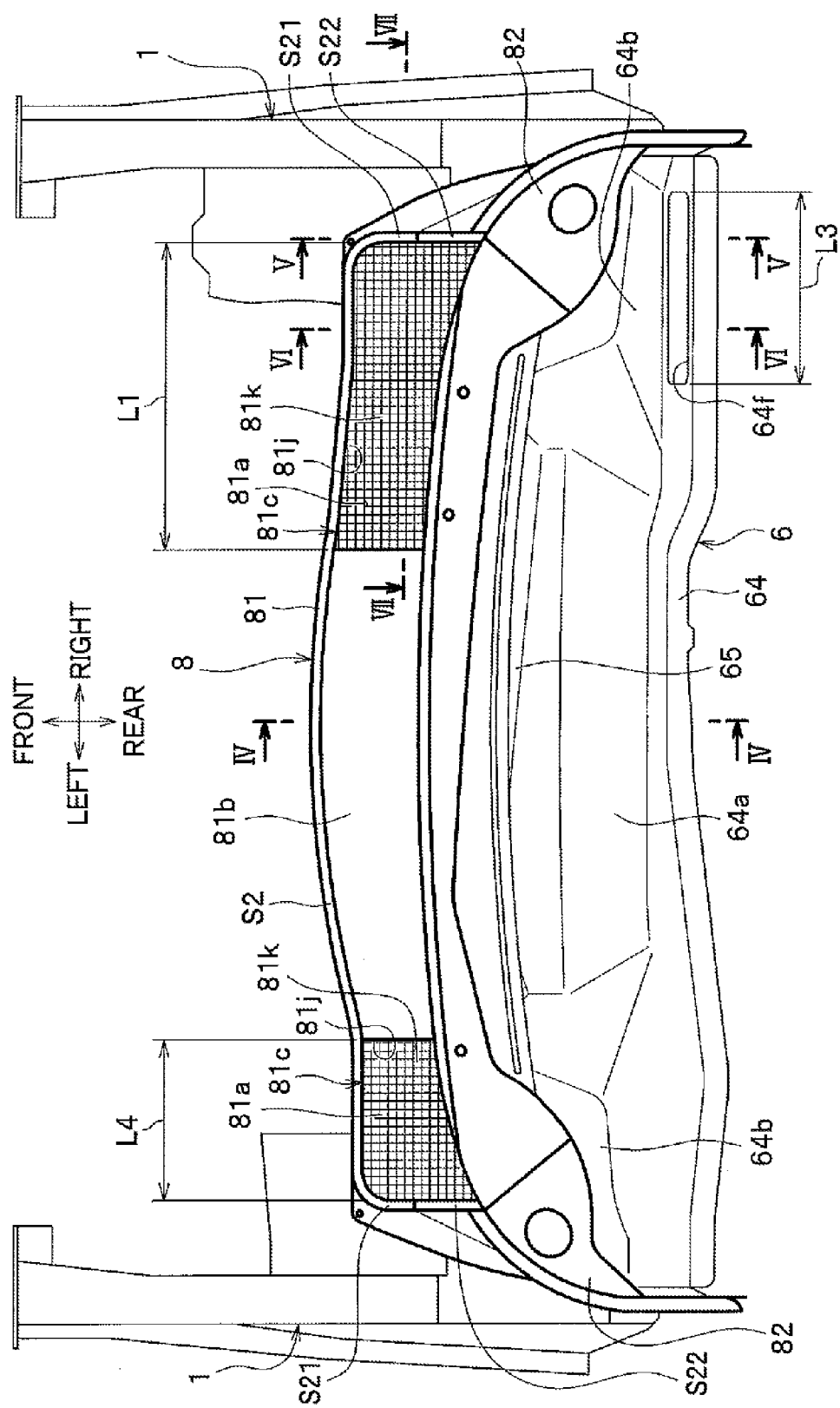
FIG. 16 is a plan view illustrating the vehicle front structure, to which the cowl top and the windshield lower member are attached.

As shown in FIG. 18, the cowl top 8 is a plastic member which covers the opening 96 formed between the engine hood 95 and the windshield lower member 6. As shown in FIG. 16, the cowl top 8 is composed of three separate members: a center cowl top 81 and a pair of side cowl tops 82 disposed at both left and right ends of the center cowl top 81.

Figure 11:
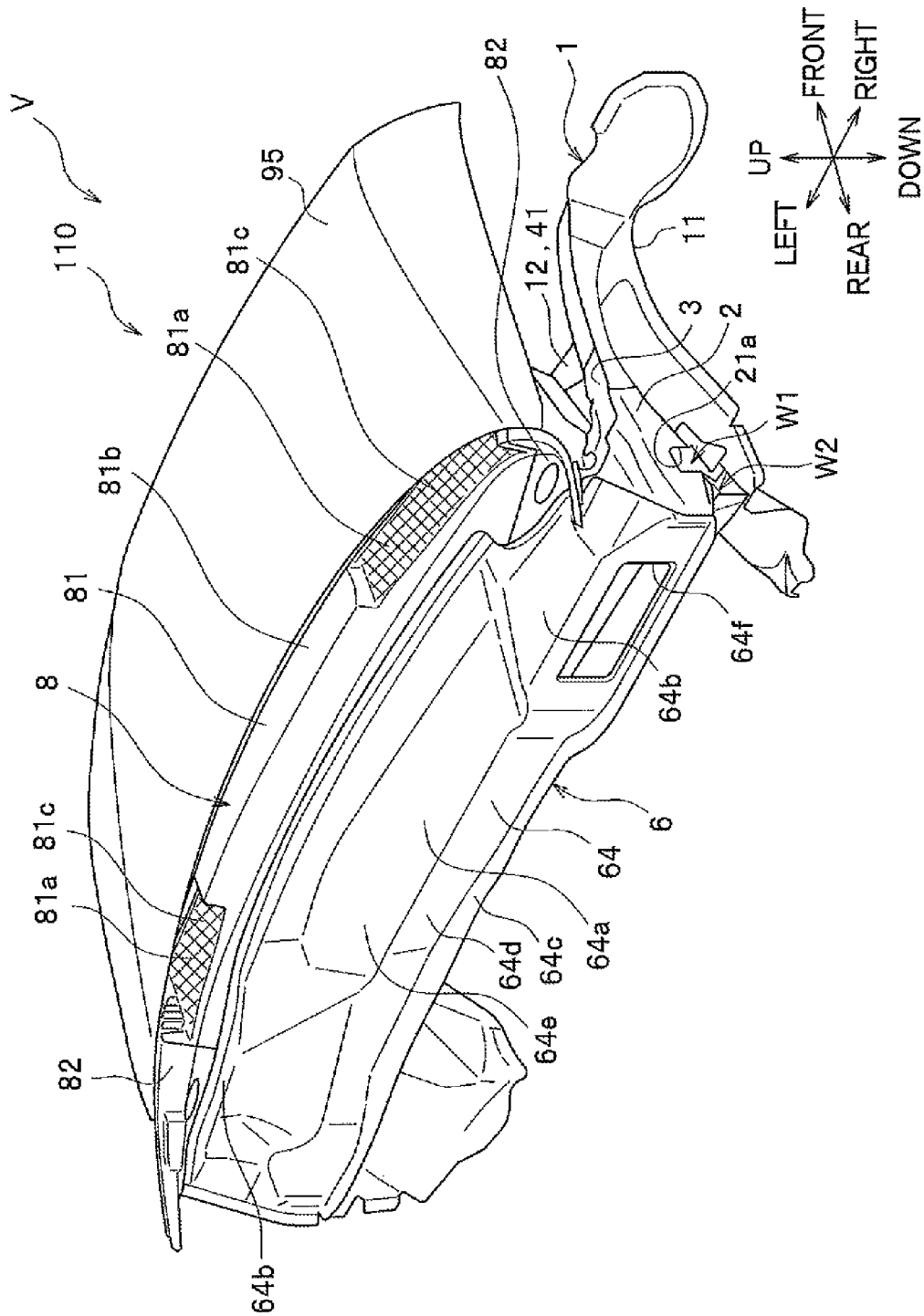
FIG. 11 is a schematic overall perspective view illustrating a vehicle front structure according to a second embodiment of the present invention, as viewed down from obliquely rightward and rearward.

As shown in FIG. 11, the center cowl top 81 includes: a bulge portion 81b which is disposed at the vehicle width directional center side and bulges above other portions by predetermined lengths; and an outside air introduction portions 81c which are disposed at both the left and right sides of the bulge portion 81b.

As shown in FIG. 17, the bulge portion 81b is disposed in front of the closed cross section K. The rear end of the bulge portion 81b is formed with a rear wall portion 81d which extends in parallel with the front glass 93. The rear wall portion 81d is disposed above the front glass 93 and above the vehicle width directional center side of the support member 65. The rear wall portion 81d and the upper surface of the front glass 93 have a seal S3 provided therebetween. The rear wall portion 81d has an opening 81e extending therethrough vertically. The opening 81e serves to guide the water from the front glass 93 to the third water drainage path W3. The upper end of the bulge portion 81b is formed with a center wall portion (rib) 81f extending downward.

Figure 20:
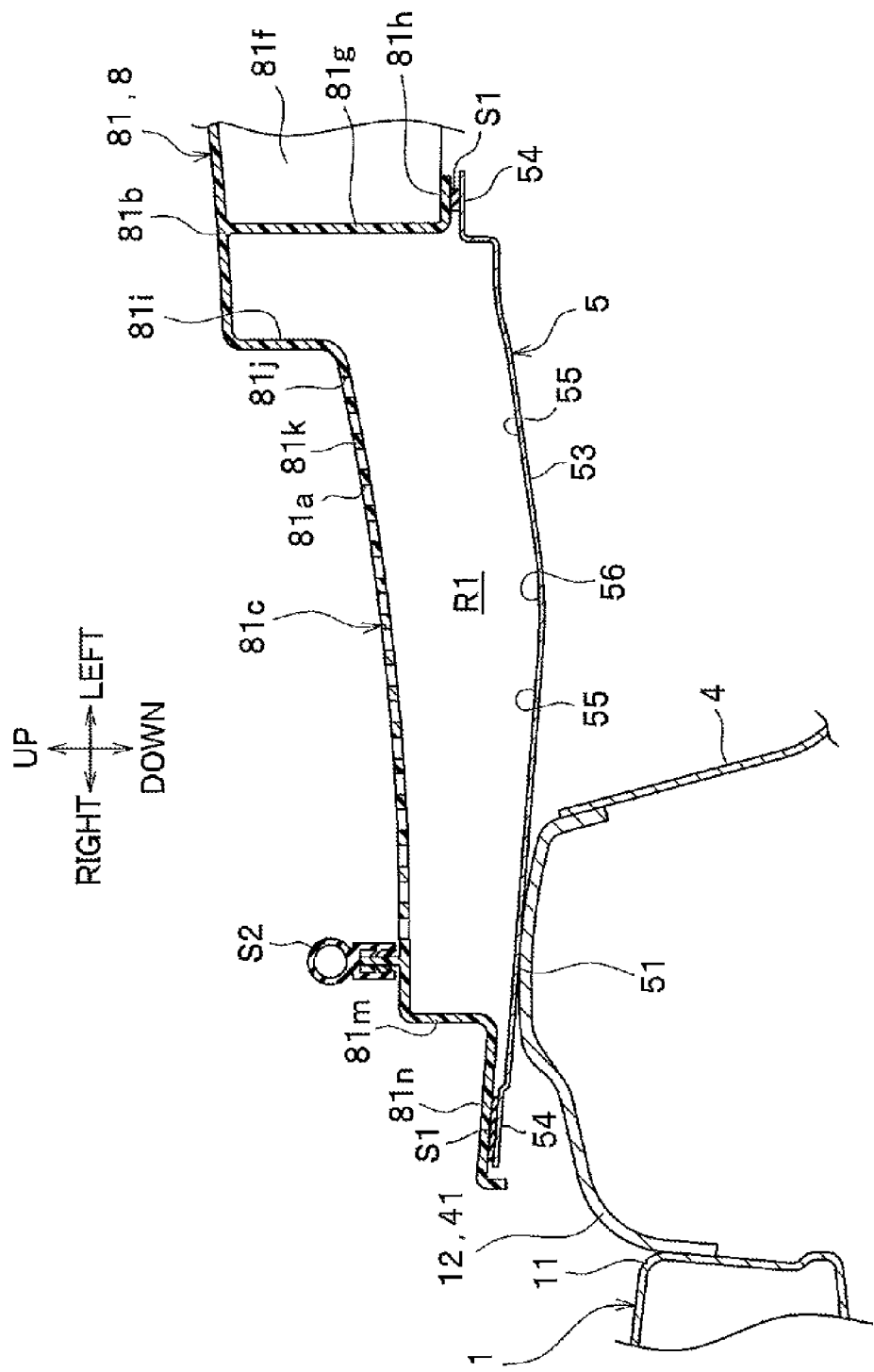
FIG. 20 is a sectional end view taken along line VII-VII of FIG. 16.

The center wall portion 81f is disposed in front of the rear wall portion 81d and arranged on the flange portion 65c of the support member 65 with an intervening seal S4. As shown in FIG. 13, the center wall portion 81f has a bead shape (a raised and recessed shape), and extends in the vehicle width direction. At the vehicle width directional outside of the center wall portion 81f, a blocking wall portion 81g extends continuously in the front-rear direction. As shown in FIG. 20, the blocking wall portion 81g is formed extendingly from the upper end of the bulge portion 81b toward the damper housing support 5. At the lower end of the blocking wall portion 81g, a flange portion 81h is formed extendingly toward the inside in the vehicle width direction. The flange portion 81h is disposed, with an intervening seal S1, on the flange portion 54 of the damper housing support 5. The blocking wall portion 81g serves to block a gap formed between the cowl top 8 and the damper housing support 5 and form a part of the side wall of the first air intake path R1. At the vehicle width directional outside of the bulge portion 81b, a side wall portion 81i is formed extendingly downward. The lower end of the side wall portion 81i extends continuously to the inside of the outside air introduction portion 81c in the vehicle width direction. It is noted that only the damper housing support 5, or both of the cowl top 8 and the damper housing support 5, may have the blocking wall portion.

Figure 19:
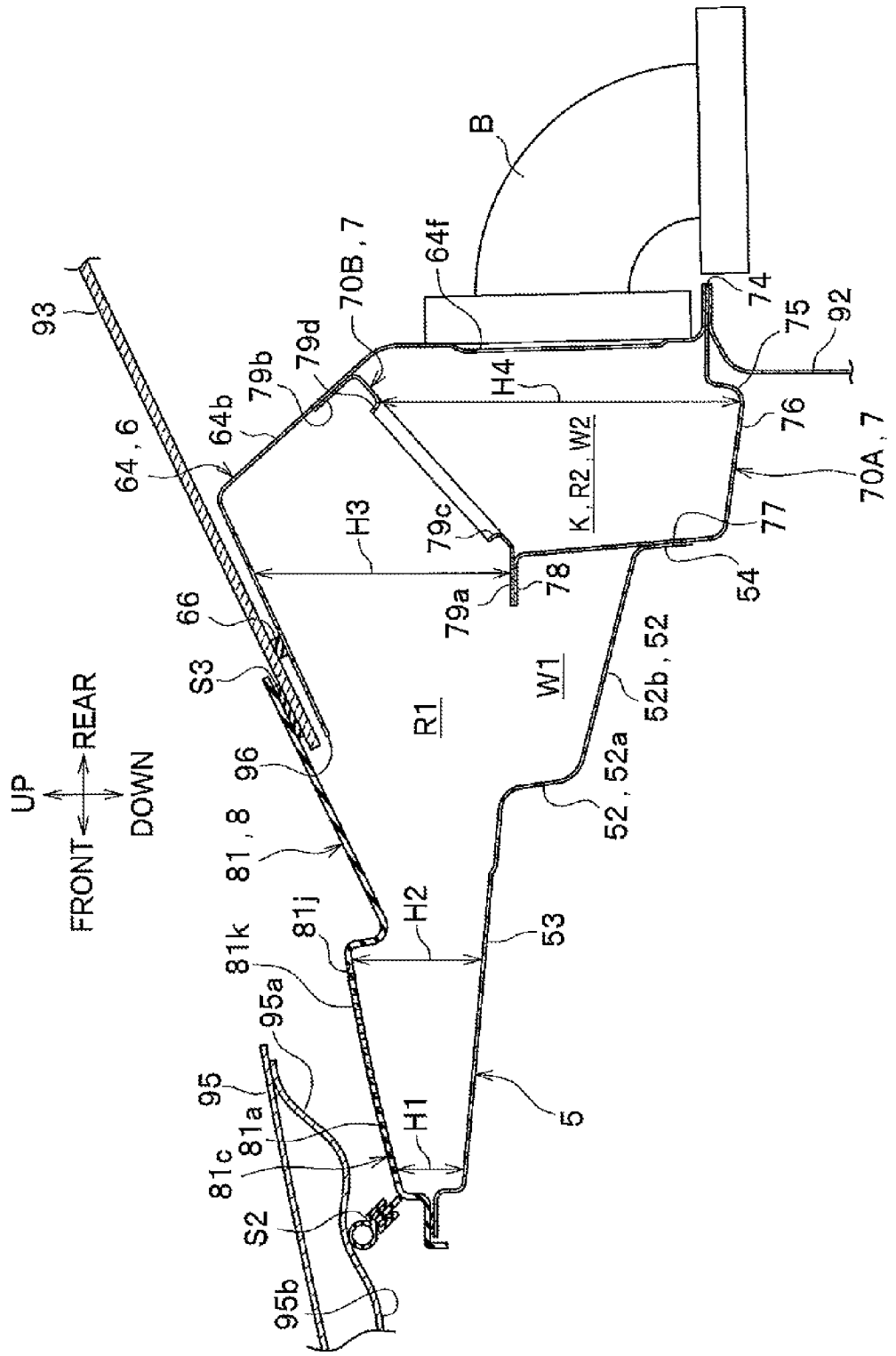
FIG. 19 is a sectional end view taken along line VI-VI of FIG. 16.

As shown in FIG. 19, the rear end of the outside air introduction portion 81c is disposed above the bulge portion 64b of the windshield lower member main body 64. The outside air introduction portion 81c has the outside air introduction openings 81a for introducing the outside air from vehicle outside. The outside air introduction openings 81a are formed with a wire net (wire net-like component) 81k covering the opening 81j which is open at the upper end of the outside air introduction portion 81c. The outside air introduction openings 81a are disposed below the rear end of the engine hood 95 and above the damper housing support 5. There is provided, around the outside air introduction openings 81a, a seal S2 which pressingly contacts the engine hood 95. As shown in FIG. 16, the seal (second seal) S2 is substantially U-shaped in a plan view, and extends from the outside of the outside air introduction openings 81a at right side, via the front of the outside air introduction openings 81a at right and left sides, to the outside of the outside air introduction openings 81a at left side. Thereby, the engine hood 95 and the cowl top 8 are kept air-tight (or hermetical) and liquid-tight, to prevent the heated air from the engine room ER from flowing into the outside air introduction openings 81a.

As shown in FIG. 18, the rear end of the engine hood 95 has an inclined surface 95a (second inclined surface) which is formed in such an inclining manner that it is positioned to be higher as extending from front to rear. The inclined surface 95a is formed continuously from the rear end of the lower surface 95b facing the engine room ER. The inclined surface 95a is steeper than the lower surface 95b. As shown in FIG. 21, the seal S2 includes: a lower surface seal S21 which pressingly contacts the lower surface 95b, and an inclined surface seal S22 which is formed separately from the lower surface seal S21 and pressingly contacts the inclined surface 95a. The inclined surface seal S22 is disposed outside the outside air introduction openings 81a.

As shown in FIG. 20, at the vehicle width directional outside of the outside air introduction portion 81c, a vertical wall portion 81m is formed extendingly toward the damper housing support 5. The vertical wall portion 81m forms the side wall of the first air intake path R1. Also, at the lower end of the vertical wall portion 81m, the flange portion 81n is formed extendingly toward the outside in the vehicle width direction. The flange portion 81n is disposed, with the intervening seal S1, on the flange portion 54 of the damper housing support 5. It is noted that only the damper housing support 5, or both of the cowl top 8 and the damper housing support 5, may have the vertical wall portion forming the side wall of the first air intake path R1.

As shown in FIG. 21, the side cowl top 82 is disposed above the bulge portion 64b of the windshield lower member main body 64. Although a gap G is created between the center cowl top 81 and the side cowl top 82, this gap G is closed by a blocking member, not shown in the drawings, formed separately from the cowl top 8. The blocking member is fixed in a tight contact on the cowl top 8, the side member 3 and others, with an intervening seal not shown in the drawings. Also, the side extension 2 has, at the lower portion of the rear end thereof, a cutout 21a which has been formed by cutting out. The cutout 21a communicates with the first water drainage path W1 and the second water drainage path W2. Thereby, the water after having flowed through the first water drainage path W1 and the second water drainage path W2 is drained through the cutout 21a to the side area of the vehicle V.

As shown in FIG. 19, each of left and right sides of the vehicle V has the first air intake path R1 which is extendingly disposed in the front-rear direction. The first air intake path R1 is a space which extends from the outside air introduction openings 81a to the outside air intake opening 79c and is defined by the cowl top 8, the damper housing support 5, the windshield lower member 6 and the reinforcement member 70B. Also, the closed cross section K formed between the cross member 7 and the windshield lower member 6 serves as the second air intake path R2 which extends in the left-right direction to communicate between the first air intake paths R1 at both left and right sides. With the structure like this, the outside air after having been introduced from the outside air introduction openings 81a at front right side of the cowl top 8 flows through the first air intake path R1 and the outside air intake opening 79c both at right side, then to be guided through the blower air intake opening 64f toward the blower B (refer to FIG. 16 and FIG. 18). On the other hand, the outside air after having been introduced from the outside air introduction openings 81a at front left side of the cowl top 8 flows through the first air intake path R1 and the outside air intake opening 79c both at left side, then to further flow through the second air intake path R2 from left to right, and thereafter is guided through the blower air intake opening 64f toward the blower B (refer to FIG. 16 to FIG. 18).

As shown in FIG. 19, the height dimensions H1, H2 at the front of the first air intake path R1 are set to be smaller than the height dimensions H3, H4 at the rear, which lowers the engine hood 95. On the other hand, as shown in FIG. 15 and FIG. 16, the width dimension L1 of the outside air introduction openings 81a at right side is set to be larger than the width dimension L2 of the blower air intake opening 64f and the width dimension L3 of the outside air intake openings 79c. Thereby, even when the height dimensions H1, H2 below the outside air introduction openings 81a are decreased to lower the engine hood 95, the sufficient amount of the outside air is introduced into the first air intake path R1 at right side. Also, the width dimension L2 of the blower air intake opening 64f is identical with or approximately identical with the width dimension L3 of the outside air intake openings 79c. Thereby, the sufficient amount of the outside air is taken into the blower B. Also, as shown in FIG. 16, the width dimension L1 of the outside air introduction openings 81a at right side is set to be larger than the width dimension L4 of the outside air introduction openings 81a at left side. This increases the amount of the outside air which is introduced from the outside air introduction openings 81a at right side and flows substantially linearly (smoothly) toward the blower air intake opening 64f, so that more outside air is taken into the blower B. Further, as shown in FIG. 18, the front ends of the cowl top 8 and the damper housing support 5 extend frontward beyond the damper housing 4. Thereby, the first air intake path R1 has a long front-rear distance, which prevents the water from entering into the blower air intake opening 64f.

According to the second embodiment of the present invention, the vehicle front structure 110 is basically structured as above. Next, referring to FIG. 18 and FIG. 21, its operation and effect will be described.

It is noted that the arrows each depicted with a solid line in FIG. 18 represent an air flow, and the arrows each depicted with a dashed line represent a water flow. Also, the arrows each depicted with a solid line in FIG. 21 represent a water flow.

As shown in FIG. 18, the outside air after having introduced from the outside air introduction openings 81a at right side is taken into the blower B through the first air intake path R1, the outside air intake opening 79c and the blower air intake opening 64f. Also, the outside air having introduced from the outside air introduction openings 81a at left side is taken into the blower B through the first air intake path R1, the outside air intake opening 79c, the second air intake path R2 and the blower air intake opening 64f. Then, the outside air is taken through the blower B into the passenger room CR.

On the other hand, the water after having flowed into from the outside air introduction openings 81a at both left and right sides (for example, water used to wash the vehicle, rain water and the like) is either guided directly from the upper surface 41 of the damper housings 4 and the upper surface of the damper housing fixation portion 51 to the first water drainage path W1, or guided to the first water drainage path W1 after hitting the front vertical wall portion 77 of the cross member 7, and thereafter the water flows down on the bottom wall portion 52b of the lateral wall portion 52 to the side area of the vehicle V. As shown in FIG. 21, the water after having flow down on the bottom wall portion 52b is drained through the cutout 21a of the side extension 2 to the side area of the vehicle V.

Also, the water not having flowed into the first water drainage path W1 but having passed through the outside air intake opening 79c hits the vertical wall portion 64d of the windshield lower member 6 to be guided to the second water drainage path W2, and thereafter the water flows down on the lateral wall portion 76 of the cross member 7 to the side area of the vehicle V. As shown in FIG. 21, the water after having flow down on the lateral wall portion 76 is drained through the cutout 21a of the side extension 2 to the side area of the vehicle V.

According to the present embodiment described above, the substantially same operation and effect as those in the first embodiment are performed.

Also, according to the present embodiment, the damper housing support 5 is formed to be wider toward the inside in the vehicle width direction than the upper surface 41 of the damper housings 4, which makes it possible for the outside air introduction openings 81a to have a larger width dimension L1. Thereby, a sufficient amount of the outside air is introduced even when the height dimensions H1, H2 below the outside air introduction openings 81a are set to be small, and the engine hood 95 is arranged at a lower position by decreasing the height dimensions H1, H2 below the outside air introduction openings 81a.

According to the present embodiment, the windshield lower member main body 64 has, at both vehicle width directional end sides thereof, the bulge portions 64b which are formed so as to bulge above the vehicle width directional center side of the windshield lower member main body 64 by a predetermined length. Additionally, the first air intake path R1 is defined by the cowl top 8, the damper housing support 5, the bulge portion 64b and the reinforcement member 70B. Thereby, the height dimension H3 of the first air intake path R1 at the bulge portion 64b is increased to introduce a sufficient amount of outside air, and the vehicle width directional center side of the windshield lower member main body 64 is lowered, which lowers the engine hood 95 in position.

According to the present embodiment, the center side of the rear end of the center cowl top 81 is disposed above the vehicle width directional center side of the support member 65. Additionally, both the left and right sides of the rear end of the center cowl top 81 are disposed above the bulge portions 64b of the windshield lower member main body 64. Additionally, the center of the center cowl top 81 in the vehicle width direction is disposed in front of the closed cross section K. Thereby, even when the engine is disposed below the center cowl top 81, the position of the engine hood 95 is lowered.

According to the present embodiment, the width dimension L1 of the outside air introduction openings 81a at right side facing the blower air intake opening 64f is set to be larger than the width dimension L4 of the outside air introduction openings 81a at left side. This increases the amount of the outside air which is introduced from the outside air introduction openings 81a at right side and flows substantially linearly (smoothly) toward the blower air intake opening 64f, which has more outside air taken into the blower B.

According to the present embodiment, the outside air introduction openings 81a are formed by the wire net 81k covering the opening 81j which is open at the upper end of the outside air introduction portion 81c. This structure has the outside air introduced efficiently through the wire net 81k of a high open percentage, while absorbing (collecting) water, dust and the like.

According to the present embodiment, the center cowl top 81 includes the vertical wall portion 81m and the blocking wall portion 81g which protrudingly extend toward the damper housing support 5 to form the side walls of the first air intake path R1. This structure prevents the outside air from leaking out of the first air intake path R1, thereby increasing the capacity of the first air intake path R1.

According to the present embodiment, the reinforcement members 70B disposed at both vehicle width directional end sides of the cross member main body 70A is inclined in such a manner that it is positioned to be higher as extending from front to rear and include the outside air intake opening 79c. This structure reduces the flow-in resistance against the outside air flowing through the outside air intake opening 79c of the reinforcement member 70B, thereby reducing the power consumption of the blower B.

According to the present embodiment, the outside air introduction openings 81a are disposed below the rear end of the engine hood 95 and at a predetermined distance apart from the rear end of the engine hood 95, which prevents the water from entering from the vehicle outside.

According to the present embodiment, the outside air introduction openings 81a are disposed below the rear end of the engine hood 95 and at a predetermined distance apart from the rear end of the engine hood 95, and the damper housing support 5 is formed to be wider in a frontward direction than the upper surface 41 of the damper housings 4. This structure increases the front-rear distance from the outside air introduction openings 81a to the blower air intake opening 64f, thereby preventing the water from entering into the blower air intake opening 64f.

According to the present embodiment, the damper housing support 5 includes: the pair of left and right inclined surfaces 55 which are inclined in such a manner that they are positioned to be lower as extending from each end toward the center in the vehicle width direction; and the recessed portion 56 which is formed by the inclined surfaces 55 and is inclined in such a manner that they are positioned to be lower as extending from front to rear. Thereby, the water on the damper housing support 5 readily flows down on the pair of left and right inclined surfaces 55 and the recessed portion 56 to the first water drainage path W1 by its own weight.

According to the present embodiment, the cross member 7 includes the lateral wall portion 76 forming the bottom surface of the closed cross section K. Additionally, both vehicle width directional end sides of the lateral wall portion 76 are inclined downwardly in such a manner that they are positioned to be lower as extending toward the outside in the vehicle width direction. Thereby, the water on the lateral wall portion 76 of the cross member 7 readily flows down on the lateral wall portion 76 to be drained to the vehicle outside by its own weight.

According to the present embodiment, the windshield lower member 6 includes the groove-like front wall portion 65b which extends frontward beyond the front glass 93, and the front wall portion 65b forms the third water drainage path W3 for draining the water from the front glass 93 to the damper housing support 5.

Also, the center cowl top 81 includes: the rear wall portion 81d disposed above the front wall portion 65b; and the center wall portion 81f disposed in front of the rear wall portion 81d and on the front end of the front wall portion 65b (the flange portion 65c). This structure prevents the water flowing on the front wall portion 65b from leaking outside.

Further, the center cowl top 81 is disposed on the front wall portion 65b with the intervening center wall portion 81f, thereby increasing the support stiffness of the center cowl top 81.

According to the present embodiment, the seal S1 is provided between the damper housing support 5 and the cowl top 8, thereby preventing the heated air coming from the engine room ER from flowing into the first air intake path R1.

According to the present embodiment, the seal S2 is provided between the cowl top 8 and the engine hood 95, thereby preventing the heated air coming from the engine room ER from flowing into the outside air introduction openings 81a.

According to the present embodiment, the seal S2 includes: the lower surface seal S21 which pressingly contacts the lower surface 95b of the engine hood 95; and the inclined surface seal S22 which is formed separately from the lower surface seal S21 and pressingly contacts the inclined surface 95a of the engine hood 95. This structure prevents the seal S2 from bending, thus preventing a gap from occurring between the seal S2 and the engine hood 95.

DESCRIPTION OF REFERENCE NUMERALS

V vehicle
100, 110 a structure for a front portion of a vehicle (vehicle front structure)
1 upper member
2 side extension
3 side member
4 damper housing
41 upper surface
5 damper housing support
51 damper housing fixation portion
52 lateral wall portion
52a inclined portion
52b bottom wall portion
53 vertical wall portion
54 flange portion
55 inclined surface (first inclined surface)
56 recessed portion
6 windshield lower member
62a, 64f blower air intake opening
64b bulge portion
64d vertical wall portion
65b front wall portion (extending portion)
65c flange portion (extending portion)
7 cross member
70A cross member main body
70B reinforcement member 72a, 72b, 79c outside air intake opening
72a1, 72b1 lower edge
76 lateral wall portion (lower wall portion)
8 cowl top
81 center cowl top
81a outside air introduction opening
81d rear wall portion
81f center wall portion (rib)
81g blocking wall portion
81j opening
81k wire net
81o vertical wall portion (wall portion)
S1 seal (first seal)
S2 seal (second seal)
S21 lower surface seal
S22 inclined surface seal
91 front pillar
92 dashboard lower member
93 front glass
95 engine hood
95a inclined surface (second inclined surface)
95b lower surface
96 opening
ER engine room
CR passenger room
B blower
H water drainage groove
K closed cross section
C gap
R1 first air intake path
R2 second air intake path
W1 first water drainage path
W2 second water drainage path
W3 third water drainage path
H1, H2, H3, H4 height dimension
L1, L2, L3, L4 width dimension

What is claimed is:

1. A structure for a front portion of a vehicle, comprising:
   a windshield lower member supporting a front glass from below;
   a cross member fixed on the windshield lower member and disposed between paired left and right front pillars;
   paired left and right damper housings disposed in front of left and right ends of the cross member and supporting a damper, respectively;
   and paired left and right damper housing supports disposed between the cross member and the damper housings for draining, toward vehicle side areas, water after having flowed in from the vehicle outside;
   wherein the windshield lower member and the cross member define a closed cross section extending in a vehicle width direction and serving as an air intake path;
   wherein the cross member has, in rear of the damper housing supports, paired left and right outside air intake openings for outside air to pass therethrough;
   wherein the windshield lower member includes a blower air intake opening opened to face either one of the outside air intake openings and connecting with a blower;
   wherein the damper housing has an upper surface defining a flow regulating surface for outside air to flow thereon; and
   wherein the outside air intake opening has a lower edge positioned above the flow regulating surface.

2. The structure for the front portion of the vehicle according to claim 1, wherein the blower air intake opening is positioned below one of the outside air intake openings.

3. The structure for the front portion of the vehicle according to claim 1, wherein the damper housing support comprises: a damper housing fixation portion fixed on an upper surface of the damper housing; a lateral wall portion protruding downward and rearward from a rear end of the damper housing fixation portion and extending along a rear end of the damper housing, the lateral wall portion being fixed on the cross member; and a vertical wall portion protruding rearward from a vehicle width directional inside of the damper housing fixation portion and fixed on the cross member.

4. The structure for the front portion of the vehicle according to claim 3, wherein the lateral wall portion is inclined downwardly in such a manner that the lateral wall portion is positioned to be lower as extending toward outside in the vehicle width direction.

5. The structure for the front portion of the vehicle according to claim 3, further comprising a cowl top covering an opening formed between the windshield lower member and an engine hood, wherein the cowl top has paired left and right outside air introduction openings disposed below the engine hood and at a predetermined distance apart from the engine hood for introducing outside air, wherein the damper housing support extends frontward and inward in the vehicle width direction from the upper surface of the damper housing, and wherein the cowl top and the damper housing support define a first air intake path extending in a front-rear direction.

6. The structure for the front portion of the vehicle according to claim 5, wherein the damper housing support connects the cross member and the damper housing and is formed in a substantially rectangle or substantially trapezoid in a plan view, wherein the damper housing support has a front end formed to be wider than the upper surface of the damper housing, wherein the damper housing support includes a flange portion formed around an outer periphery of the damper housing support, and wherein the flange portion and the cowl top have a first seal provided therebetween.

7. The structure for the front portion of the vehicle according to claim 5, wherein the windshield lower member includes bulge portions formed at both vehicle width directional ends of the windshield lower member, the bulge portions bulging above a vehicle width directional center of the windshield lower member, wherein the first air intake path is defined by the cowl top, the damper housing support and the bulge portion.

8. The structure for the front portion of the vehicle according to claim 5, wherein at least one of the damper housing support and the cowl top includes a wall portion extending toward the other one of the damper housing support and the cowl top to form a side wall of the first air intake path.

9. The structure for the front portion of the vehicle according to claim 5, wherein the outside air introduction opening is disposed below a rear end of the engine hood.

10. The structure for the front portion of the vehicle according to claim 5, wherein the outside air introduction opening is constructed with a wire net-like component.

11. The structure for the front portion of the vehicle according to claim 7, wherein the cross member comprises: a cross member main body disposed between the paired left and right front pillars; paired left and right reinforcement members disposed at both vehicle width directional ends of the cross member main body and arranged between the windshield lower member and the cross member main body, wherein the reinforcement members are inclined in such a manner that the reinforcement members are positioned to be higher as extending from front to rear, and wherein the reinforcement members have the outside air intake openings, respectively.

12. The structure for the front portion of the vehicle according to claim 5, wherein the damper housing support has a recessed portion formed with paired left and right first inclined surfaces which are inclined in such a manner that the first inclined surfaces are positioned to be lower as extending from each end toward a center in the vehicle width direction, wherein the recessed portion is inclined in such a manner that the recessed portion is positioned to be lower as extending from front to rear.

13. The structure for the front portion of the vehicle according to claim 1, wherein the cross member has a lower wall portion defining a bottom surface of the closed cross section, wherein both end sides of the lower wall portion in the vehicle width direction are inclined downwardly in such a manner that the end sides of the lower wall portion are positioned to be lower as extending outward in the vehicle width direction.

14. The structure for the front portion of the vehicle according to claim 5, wherein the cowl top and the engine hood have a second seal provided therebetween.

15. The structure for the front portion of the vehicle according to claim 14, wherein the engine hood includes: a lower surface facing an engine room; and a second inclined surface continuously extending from a rear end of the lower surface and inclined in such a manner that the second inclined surface is positioned to be higher as extending from front to rear, wherein the second seal includes: a lower surface seal pressingly contacting the lower surface; and an inclined surface seal formed separately from the lower surface seal and pressingly contacting the second inclined surface.

16. The structure for the front portion of the vehicle according to claim 5, wherein either one of the paired outside air introduction openings is arranged to face the blower air intake opening and is formed to be wider than the other one of the paired outside air introduction openings.

17. The structure for the front portion of the vehicle according to claim 7, wherein the cowl top includes a rear end including: both vehicle width directional sides disposed at both vehicle width directional end sides of the windshield lower member; and a vehicle width directional center side disposed at a vehicle width directional center side of the windshield lower member, and wherein the vehicle width directional center side of the cowl top is disposed in front of the closed cross section.

18. The structure for the front portion of the vehicle according to claim 5, wherein the windshield lower member includes a groove-like extending portion extending frontward beyond the front glass, and wherein the cowl top includes: a rear wall portion disposed above the extending portion and fixed on the front glass; and a rib disposed at a front end of the extending portion in front of the rear wall portion and extending in an up-down direction.

* * * * *